(12) United States Patent
Bair, III et al.

(10) Patent No.: US 8,537,018 B2
(45) Date of Patent: Sep. 17, 2013

(54) REFRIGERATION SYSTEM MANAGEMENT AND INFORMATION DISPLAY

(75) Inventors: Richard H. Bair, III, Weaverville, NC (US); Michael W. Brown, Weaverville, NC (US); Norman P. Davies, Asheville, NC (US)

(73) Assignee: Thermo Fisher Scientific (Asheville) LLC, Asheville, NC (US)

( * ) Notice: Subject to any disclaimer, the term of this patent is extended or adjusted under 35 U.S.C. 154(b) by 239 days.

(21) Appl. No.: 12/797,037

(22) Filed: Jun. 9, 2010

(65) Prior Publication Data

US 2011/0304466 A1 Dec. 15, 2011

(51) Int. Cl.
G08B 17/00 (2006.01)

(52) U.S. Cl.
USPC .......................... 340/585; 340/815.4; 62/125

(58) Field of Classification Search
USPC ................ 340/585, 815.4, 500, 501; 62/126, 62/125, 40, 231, 232
See application file for complete search history.

(56) References Cited

U.S. PATENT DOCUMENTS

| | | | |
|---|---|---|---|
| 4,459,825 A | 7/1984 | Crouch | |
| 5,355,686 A | 10/1994 | Weiss | |
| 5,460,006 A | 10/1995 | Torimitsu | |
| 6,034,607 A | 3/2000 | Vidaillac | |
| 6,101,819 A | 8/2000 | Onaka et al. | |
| 6,119,469 A | 9/2000 | Elwood | |
| 6,216,479 B1 | 4/2001 | Elwood | |
| 6,453,687 B2 | 9/2002 | Sharood et al. | |
| 6,502,411 B2 | 1/2003 | Okamoto | |
| 6,612,116 B2 | 9/2003 | Fu et al. | |
| 6,782,706 B2 | 8/2004 | Holmes et al. | |
| 6,950,028 B2 | 9/2005 | Zweig | |
| 7,172,134 B2 | 2/2007 | Welch | |
| 7,201,005 B2 | 4/2007 | Voglewede et al. | |
| 7,436,317 B2 | 10/2008 | Becke et al. | |
| 7,617,690 B2 * | 11/2009 | Dawes ........................... 62/131 |
| 2002/0000092 A1 | 1/2002 | Sharood et al. | |
| 2005/0132725 A1 | 6/2005 | Menten et al. | |

(Continued)

FOREIGN PATENT DOCUMENTS

| | | |
|---|---|---|
| JP | 10-307064 A | 11/1998 |
| JP | 2001-005610 A | 1/2001 |
| JP | 2001-215136 A | 8/2001 |

OTHER PUBLICATIONS

New Brunswick Scientific, Ultra-Low Temperature Freezers, Brochure, 6.07PG10 B5003c-4, Edison, NJ (13 pages).

(Continued)

*Primary Examiner* — George Bugg
*Assistant Examiner* — Edny Labbees
(74) *Attorney, Agent, or Firm* — Wood, Herron & Evans, LLP

(57) ABSTRACT

Embodiments of the invention provide methods of displaying information associated with a refrigeration system, methods for managing a refrigeration system, refrigeration systems, methods of providing redundancy to a refrigeration system, and injector systems. A refrigeration system and method for displaying information associated with a refrigeration system includes monitoring a temperature associated with the refrigeration system, detecting events associated with the refrigeration system, and displaying the temperature and at least one event associated with the refrigeration system occurring during a predetermined period of time, including displaying the temperature occurring during the predetermined period of time and displaying a user interface element associated with at least one event occurring during the predetermined period of time.

49 Claims, 24 Drawing Sheets

(56) References Cited

U.S. PATENT DOCUMENTS

2006/0090482 A1    5/2006   Dawes
2009/0093917 A1    4/2009   Smith
2009/0132090 A1*   5/2009   Kaczmarz et al. ............ 700/275

OTHER PUBLICATIONS

Sanyo Electric Co., Ltd., Ultra-Low Temperature V.I.P. Freezer, MDF-U73V, Brochure, 2007 Sanyo Printed in Japan 2007.7 MA SHR 107 (2 pages).

Sanyo E&E America Company, V.I.P. Series -86° C. Ultra Temperature Freezers, DM0915V.1-06 V.I.P. 32/53/73 USA Sep. 2006 (6 pages).

Heinz Gassen, Ids—Uberwachungs- und Steuerungssystem fur Gewerbekalteanlagen, Berichte Aus Technik Und Wissenschaft, Linde AG. Wiesbaden, DE, No. 70, Jan. 1, 1993, pp. 10-14, XP000439151, Issn: 0942-332X.

European Patent Office, English Abstract of Japanese Publication No. JP10307064, Published Nov. 17, 1998 (1 page).

European Patent Office, English Abstract of Japanese Publication No. JP2001005610, Published Jan. 12, 2001 (1 page).

European Patent Office, English Abstract of Japanese Publication No. JP2001215136, Published Aug. 10, 2001 (1 page).

European Patent Office, International Search Report and Written Opinion of the International Searching Authority, International Application No. PCT/US2011/039580, mailed Sep. 27, 2012 (11 pages).

The International Bureau of WIPO, International Preliminary Report on Patentability, International Application No. PCT/US2011/039580, issued Dec. 10, 2012 (5 pages).

\* cited by examiner

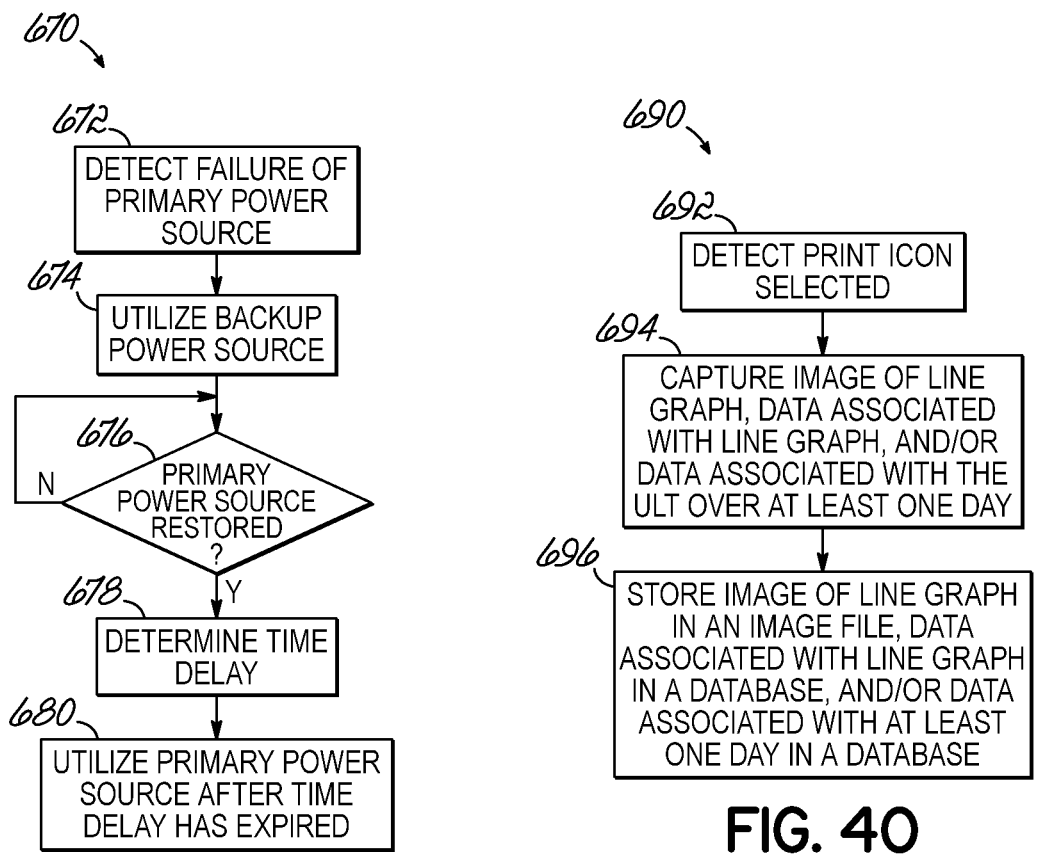
FIG. 39
FIG. 40
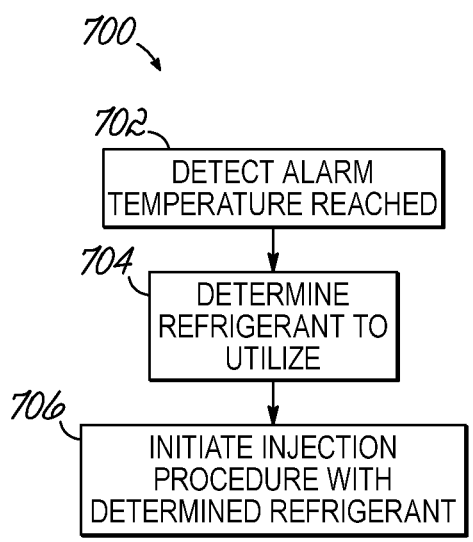
FIG. 41

REFRIGERATION SYSTEM MANAGEMENT AND INFORMATION DISPLAY

FIELD OF THE INVENTION

The present invention relates generally to refrigeration systems and, more particularly, to displaying information associated with and managing the operation of those refrigeration systems.

BACKGROUND OF THE INVENTION

Refrigeration systems are known, such as the type known as "ultra-low temperature freezers" ("ULTs"), which cool their interior storage spaces to relative low temperatures such as about −80° C. or lower, for example.

Known refrigeration systems of this type include two stages circulating respective first and second refrigerants. The first stage transfers energy (i.e., heat) from the first refrigerant to the surrounding environment through a condenser, while the second refrigerant of the second stage receives energy from the cooled space (e.g., a cabinet interior) through an evaporator. Heat is transferred from the second refrigerant to the first refrigerant through a heat exchanger that is in fluid communication with the two stages of the refrigeration system.

However, management of these refrigeration systems is often cumbersome. For example, inputting settings to a refrigeration system is often performed by a manufacturer or distributor prior to providing that refrigeration system to a customer. Alternatively, some conventional refrigeration systems include a keypad for the user to enter settings, but such entry often introduces errors as the keypads are typically difficult to use. In any event, normal operations of a plurality of refrigeration system can cause unforeseen undesirable outcomes. For example, a plurality of refrigeration systems often recover from a power failure at the same time, typically resulting in a surge of demand that the power system is unable to cope with.

Moreover, it is often difficult to interface with or otherwise track data associated with refrigeration systems. In particular, conventional refrigeration systems are unable to display information about temperatures within the refrigeration systems, or events associated with the refrigeration system, that occur over an extended period of time. This can lead to questions about the operation of conventional refrigeration systems that go unanswered, as there is no data that indicates how those conventional refrigeration systems operated. Moreover, conventional refrigeration systems often fail to display ambient temperatures that are used as baselines and additional information associated with the refrigeration system. Still further, conventional refrigeration systems lack security features that indicate a particular user that interacted with the refrigeration system and at what time.

There is a need, therefore, for refrigeration systems that can have their settings manipulated by a user as well as track and display various operational data over predetermined periods of time.

SUMMARY OF THE INVENTION

Embodiments of the invention address the drawbacks of the known prior art and provide a method of displaying information associated with a refrigeration system as well as a refrigeration system that monitors, detects, and displays events associated with the operation of the refrigeration system.

In one embodiment, a refrigeration system and method are provided that monitor a temperature associated with the refrigeration system and detect events associated with the refrigeration system. The refrigeration system and method further displays the temperature and at least one event associated with the refrigeration system occurring during a predetermined period of time, including displaying the temperature occurring during the predetermined period of time and displaying an user interface element associated with the at least one event occurring during the predetermined period of time.

In alternative embodiments, another refrigeration system and method are provided that display information associated with a refrigeration system. The refrigeration system and method monitor at least one temperature associated with the refrigeration system utilizing a plurality of temperature sensors located within the refrigeration system and display a graphical representation of at least a portion of the refrigeration system. The refrigeration system and method further display a graphical representation of at least one temperature sensor in the graphical representation of the at least a portion of the refrigeration system.

In further alternative embodiments, another refrigeration system and method monitors a temperature associated with the refrigeration system and detects events associated with the refrigeration system. The refrigeration system and method further display at least one user interface screen associated with the refrigeration system, the at least one user interface screen including at least one user-selectable element. The refrigeration system and method still further, and in response to selection of the user-selectable element, determine and display context relevant data associated with the at least one user interface screen.

In further alternative embodiments, a method of providing redundancy to a refrigeration system and an injector system is provided. In those embodiments, the injector system and method receive a high temperature threshold, monitor a temperature associated with the refrigeration system, and, in response to the temperature meeting or exceeding the high temperature threshold, initiate an injection sequence using at least one predetermined cold source.

In alternative embodiments, another refrigeration system and method determine, based on user input, a range of time from within which to select a variable time and randomly select the variable time from within the range of time. The refrigeration system and method further monitor a primary power source that supplies power to at least a portion of the refrigeration system and, in response to detecting a failure associated with the primary power source, supply power to the at least a portion of the refrigeration system with a backup power source. The refrigeration system and method still further, and in response to detecting a recovery of the primary power source, supply power to the at least a portion of the refrigeration system with the primary power source after at least the variable time has elapsed.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 39 is a flowchart illustrating a sequence of operations for the ULT of FIG. 1 to recover from a failure of a primary power source.

FIG. 40 is a flowchart illustrating a sequence of operations for the ULT of FIG. 1 to store data files in a memory.

FIG. 41 is a flowchart illustrating a sequence of operations to initiate an injection procedure associated with the ULT of FIG. 1.

DETAILED DESCRIPTION

Figure 1:
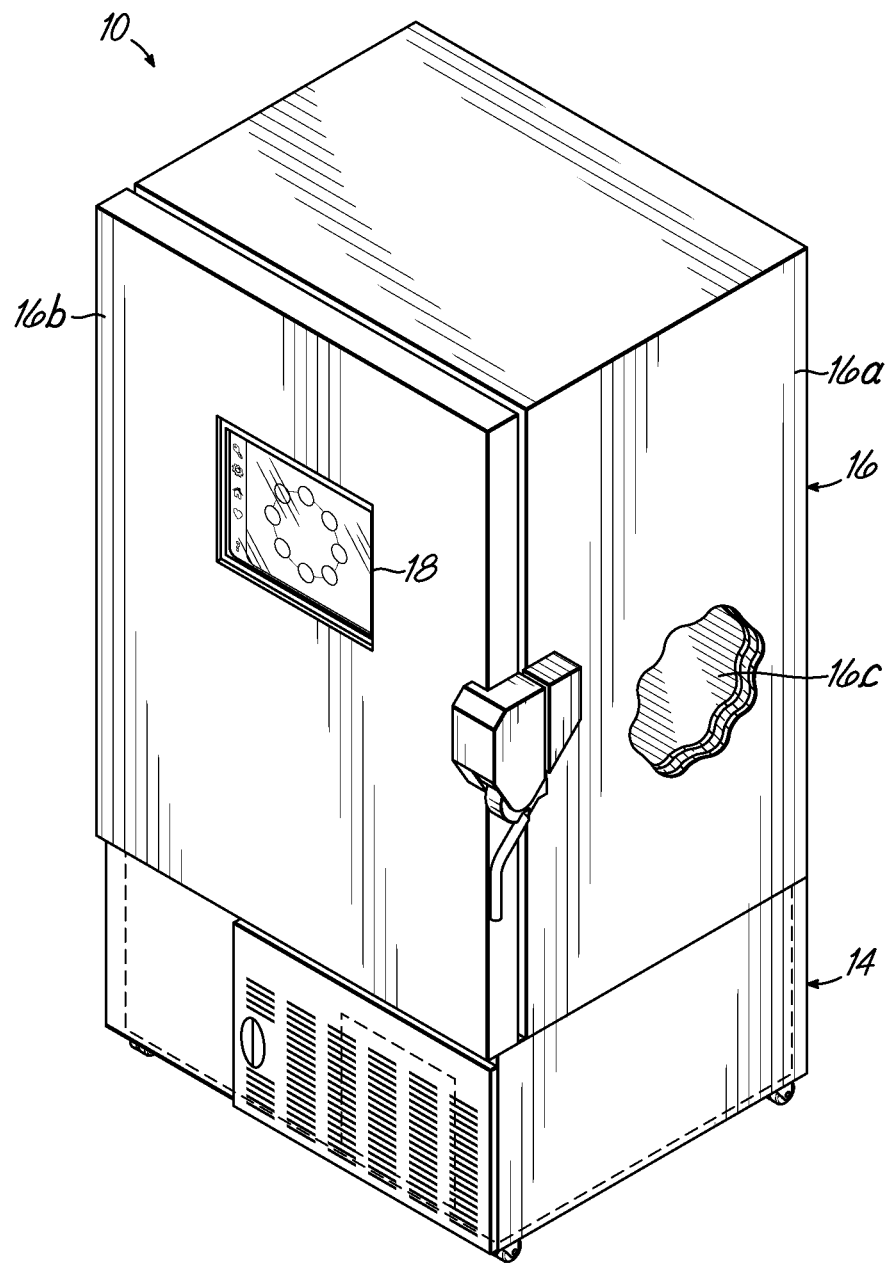
FIG. 1 is a partially broken perspective view of an exemplary refrigeration system, and in particular, an ultra-low temperature freezer ("ULT"), in accordance with an embodiment of the invention.

With reference to the figures, and more specifically to FIG. 1, an exemplary refrigeration system according to one embodiment of the present invention is illustrated. The system of FIG. 1 is in the form of an ultra-low temperature freezer ("ULT") 10 having a deck 14 that supports a cabinet 16 thereabove, for storing items that require cooling to temperatures of about −80° C. or lower, for example. The cabinet 16, in turn, includes a cabinet housing 16a and a door 16b providing access into an interior 16c of the cabinet 16. The cabinet 16 further includes at least one user interface 18. As illustrated in FIG. 1, the user interface 18 is mounted on the cabinet door 16b. The user interface 18 may receive data (including, for example, through a keyboard, mouse, a microphone, and/or other user interface device) and/or output data (including, for example, through a display, speakers, a printer, and/or another user output device). In specific embodiments, the user interface 18 is a touchscreen operative to both receive data from and output data to a user. As illustrated in FIG. 1, the user interface 18 is mounted on the exterior of the door 16b. One having ordinary skill in the art will appreciate that in alternative embodiments the user interface 18 is mounted on a different location of the cabinet 16, and in further alternative embodiments the user interface 18 is mounted on the deck 14 of the ULT 10.

The deck 14 supports one or more components that jointly define a two-stage cascade refrigeration unit 20 (FIG. 2) that thermally interacts with cabinet 16 to cool the interior 16c thereof. As used herein, the term "deck" refers to the structural assembly or framework that is located beneath and supports the cabinet 16. An exemplary refrigeration unit similar to unit 20 is described in U.S. patent application Ser. No. 12/570,480, entitled REFRIGERATION SYSTEM MOUNTED WITHIN A DECK, and U.S. patent application Ser. No. 12/570,348, entitled REFRIGERATION SYSTEM HAVING A VARIABLE SPEED COMPRESSOR, both of which are assigned to the assignee of the present application. The disclosure of the commonly-assigned applications are incorporated by reference herein in their entirety.

With reference to FIGS. 2-5, details of the exemplary refrigeration unit 20 are illustrated. Unit 20 is made up of a first stage 24 and a second stage 26 respectively defining first and second circuits for circulating a first refrigerant 34 and a second refrigerant 36. A plurality of sensors $S_1$ through $S_{18}$ are arranged to sense different conditions of unit 20 and/or properties of the refrigerants 34, 36 in unit 20, while a controller 130 controls and logs data associated with the operation of ULT 10. The first stage 24 transfers energy (i.e., heat) from the first refrigerant 34 to the surrounding environment 40, while the second refrigerant 36 of the second stage 26 receives energy from the a cabinet interior 16c. Heat is transferred from the second refrigerant 36 to the first refrigerant 34 through a heat exchanger 44 (FIG. 5) that is in fluid communication with the first and second stages 24, 26 of the refrigeration unit 20.

The first stage 24 includes, in sequence, a first compressor 50, a condenser 54, and a first expansion device 58. A fan 62 directs ambient air across the condenser 54 through a filter 54a and facilitates the transfer of heat from the first refrigerant 34 to the surrounding environment 40. The second stage 26 includes, also in sequence, a second compressor 70, a second expansion device 74, and an evaporator 78. The evaporator 78 is in thermal communication with the interior 16c of cabinet 16 (FIG. 1) such that heat is transferred from the interior 16c to the evaporator 78, thereby cooling the interior 16c. The heat exchanger 44 is in fluid communication with the first stage 24 between the first expansion device 58 and the first compressor 50. Further, the heat exchanger 44 is in fluid communication with the second stage 26 between the second compressor 70 and the second expansion device 74. In general, the first refrigerant 34 is condensed in the condenser 54 and remains in liquid phase until it evaporates at some point within the heat exchanger 44. First refrigerant vapor is compressed by first compressor 50 before being returned to condenser 54.

In operation, the second refrigerant 36 receives heat from the interior 16c through the evaporator 78 and flows from the evaporator 78 to the second compressor 70 through a conduit 90. An accumulator device 92 is in fluid communication with conduit 90 to pass the second refrigerant 36 in gaseous form to the second compressor 70, while accumulating excessive amounts of the same in liquid form and feeding it to the second compressor 70 at a controlled rate. From the second compressor 70, the compressed second refrigerant 36 flows through a conduit 96 and into the heat exchanger 44 thermally communicating the first and second stages 24, 26 with one another. The second refrigerant 36 enters the heat exchanger 44 in gas form and transfers heat to the first refrigerant 34 while condensing into a liquid form. In this regard, the flow of the first refrigerant 34 may, for example, be counter-flow relative to the second refrigerant 36, so as to maximize the rate of heat transfer. In one specific, non-limiting example, the heat exchanger 44 is in the form of a split-flow brazed plate heat exchanger, vertically oriented within the deck 14 (FIG. 1), and designed to maximize the amount of turbulent flow of the first and second refrigerants 34, 36 within heat exchanger 44, which in turn maximizes the heat transfer from the second refrigerant 36 to the first refrigerant 34. Other types or configurations of heat exchangers are possible as well.

With continued reference to FIGS. 2-5, the second refrigerant 36 exits the heat exchanger 44, in liquid form, through an outlet 44a thereof and flows through a conduit 102, through a filter/dryer unit 103, then through the second expansion device 74, and then back to the evaporator 78 of the second stage 26 where it can evaporate into gaseous form while absorbing heat from the cabinet interior 16c. The second stage 26 of this exemplary embodiment also includes an oil loop 104 for lubricating the second compressor 70. Specifically, the oil loop 104 includes an oil separator 106 in fluid communication with conduit 96 and an oil return line 108 directing oil back into second compressor 70. Additionally, or alternatively, the second stage 26 may include a de-superheater device 110 to cool down the discharge stream of the second refrigerant 36 and which is in fluid communication with conduit 96 upstream of the heat exchanger 44.

As discussed above, the first refrigerant 34 flows through the first stage 24. Specifically, the first refrigerant 34 receives heat from the second refrigerant 36 flowing through the heat exchanger 44, leaves the heat exchanger 44 in gas form through an outlet 44b thereof and flows along a pair of conduits 114, 115 towards the first compressor 50. An accumulator device 116 is positioned between conduits 114 and 115 to pass the first refrigerant 34 in gaseous form to the first compressor 50, while accumulating excessive amounts of the same in liquid form and feeding it to the first compressor 50 at a controlled rate. From the first compressor 50, the compressed first refrigerant 34 flows through a conduit 118 and into the condenser 54. The first refrigerant 34 in condenser 54 transfers heat to the surrounding environment 40 as it condenses from gaseous to liquid form, before flowing along conduits 122, 123, through a filter/dryer unit 126, and into the first expansion device 58, where the first refrigerant 34 undergoes a pressure drop. From the first expansion device 58, the first refrigerant 34 flows though a conduit 127 back into the heat exchanger 44, entering the same in liquid form.

With continued reference to FIGS. 2-5, an exemplary insulated enclosure 150 within the deck 14 encloses one or more of the components described above, permitting sufficient insulation of those components which, in turn, improves the efficiency of the unit 20 relative to conventional refrigeration units. Specifically, the heat exchanger 44 is supported within the insulated enclosure 150 and is surrounded by sufficient amounts of insulation 152 so as to enable attainment of a desired level of efficiency of the heat exchanger 44. Moreover, a plurality of isolators 154, such as foam blocks, prevents contact between conduits within enclosure 150 in selected locations and positions the conduits and other components when the enclosure 150 is being foamed.

In this exemplary embodiment, the heat exchanger 44 is oriented generally vertically and further such that the first refrigerant 34 flows in a generally upward direction while the second refrigerant 36 flows in a generally downward direction. More specifically, the first refrigerant 34 enters the heat exchanger 44 proximate a lower portion thereof and exits the same proximate an upper portion of the heat exchanger 44. Similarly, the second refrigerant 36 enters the heat exchanger 44 proximate an upper portion thereof and exits the same proximate a lower portion of the heat exchanger 44. As discussed above, the first refrigerant 34 evaporates from a liquid to a gaseous form in heat exchanger 44, while the second refrigerant 36 condenses from a gaseous to a liquid form in heat exchanger 44.

In the exemplary embodiment of FIGS. 2-5, moreover, the insulated enclosure 150 supports within its interior the first expansion device 58 of the first stage 24. In this embodiment, the first expansion device 58 is in the form of a capillary tube, although it is contemplated that it could instead take another form such as, and without limitation, an expansion valve (not shown). In addition to the first expansion device 58, the accumulator device 116 of the first stage 24 is also supported within the interior of insulated enclosure 150, as is the filter/dryer unit 103 of the second stage 26. Those of ordinary skill in the art will readily appreciate that other components of unit 20 may be located inside the insulated enclosure 150 alternatively or in addition to those components located inside the enclosure 150 in the illustrated embodiment.

In addition to the first stage 24 and the second state 26, the ULT 10 may include, be coupled to, or be in communication with an injector system 160 that operates as a backup for the first stage 24 and/or the second stage 26. In particular, the injector system 160 may be in communication with the cabinet interior 16c and operate to inject refrigerant into the cabinet interior 16c in response to the temperature of the cabinet interior 16c rising too high. For example, when a high temperature threshold in the cabinet interior 16c is met or exceeded, an event associated with that high temperature threshold being met or crossed may be declared by the controller 130 and the injector system 160 may inject one or more refrigerant $R_1$ through $R_2$ directly into the cabinet interior 16c to quickly reduce the temperature of the cabinet interior 16c.

Among the factors which one skilled in the art can use in deciding which components to include within enclosure 150 are the expecting operating temperature of the specific component under steady state operating conditions, taking into account the boiling points and other characteristics of first refrigerant 34 and second refrigerant 36, the desired temperature at which cabinet interior 16c is to be maintained, various operating pressures and similar factors. For example, in ULT freezers with an expected cabinet temperature of about −86° C. and certain common refrigerants, the heat exchanger 44 is expected to operate under steady state conditions at about −40° C. Exemplary refrigerants suitable for the presently described embodiments include refrigerants commercially available under the respective designations R404A for the first refrigerant 34, and a mixture of R290 and R508B for the second refrigerant 36. Moreover, in specific embodiments, the first and second refrigerants may be combined with an oil to facilitate lubrication of the respective compressors 50, 70. For example, and without limitation, the first refrigerant 34 may be combined with Mobil EAL Artic 32 oil and the second refrigerant 36 may be combined with Zerol 150 Alkylbenzene oil. In another aspect of the present disclosure, the precise arrangement of the components illustrated in the figures is intended to be merely exemplary rather than limiting.

Figure 6:
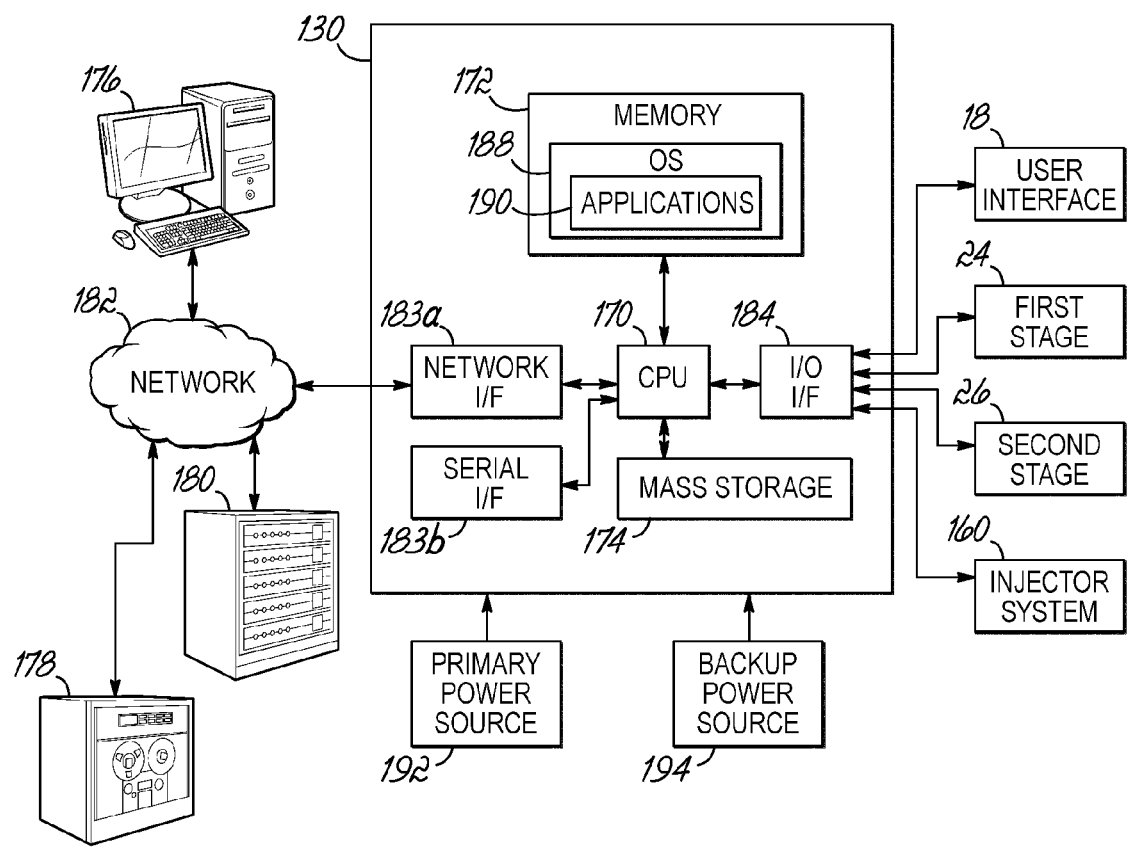
FIG. 6 is a diagrammatic illustration of a controller of the ULT of FIG. 1.

With reference to FIG. 6, an exemplary controller 130 that controls the ULT 10 and gathers data associated with the ULT 10 includes at least one central processing unit ("CPU") 170 coupled to a memory 172. Each CPU 170 is typically implemented in hardware using circuit logic disposed on one or more physical integrated circuit devices or chips. Each CPU 170 may be one or more microprocessors, micro-controllers, field programmable gate arrays, or ASICs, while memory 172 may include random access memory (RAM), dynamic random access memory (DRAM), static random access memory (SRAM), flash memory, and/or another digital storage medium, and also typically implemented using circuit logic disposed on one or more physical integrated circuit devices, or chips. As such, memory 172 may be considered to include memory storage physically located elsewhere in the ULT 10, e.g., any cache memory in the at least one CPU 170, as well as any storage capacity used as a virtual memory, e.g., as stored on a mass storage device 174 (e.g., a fixed memory, such as a hard disk drive or other fixed memory, or a removable memory, such as a USB drive or an SD memory card), another computing system 176, a network storage device 178 (e.g., a tape drive), or another network device 180 (hereinafter, a "server" 180) coupled to the controller 130 through at least one network interface 183A (illustrated as, and hereinafter, "network I/F" 183A) by way of at least one network 182. It will be appreciated that the at least one network 182 may include at least one private communications network (e.g., such as an intranet) and/or at least one public communications network (e.g., such as the Internet). The computing system 176 or server 180, in specific embodiments, is a computer, computer system, computing device, server, disk array, or programmable device such as a multi-user computer, a single-user computer, a handheld computing device, a networked device (including a computer in a cluster configuration), a mobile telecommunications device, a video game console (or other gaming system), etc. In addition to the network I/F 183A, the controller includes at least one serial interface 183B (illustrated as, and hereinafter, "serial I/F" 183B) to communicate serially with an external device, such as the computing system 176 and/or server 180, for example. In alternative embodiments, the serial I/F 183B is configured to communicate with a portable memory, such as a USB storage device (not shown) or a flash memory card (not shown) from which to transfer and/or receive data.

The controller 130 is coupled to the user interface 18 through an input/output device interface 184 (illustrated as, and hereinafter, "I/O I/F" 184). The controller 130 is also coupled to various other components of the ULT 10 through the I/O I/F 184, including sensors $S_1$ through $S_{18}$, which may include temperature sensors (e.g., for the cabinet interior 16c, for the first stage 24, for the second stage 26, and for the ambient temperature of the environment of the ULT 10) as well as event sensors (e.g., for power loss events, power restoration events, door open events, door close events, component failure events, and injection procedure events) ("sensors" shown illustratively at 186). Moreover, the controller 130 is coupled to components of the first stage 24, components of the second stage 26, and the injector system 160 through the I/O I/F 184.

The controller 130 is typically under the control of an operating system 188 and executes or otherwise relies upon various computer software applications, sequences of operations, components, programs, files, objects, modules, etc., consistent with embodiments of the invention. In specific embodiments, the controller 130 executes or otherwise relies on at least one application 190 to control the ULT 10, gather information associated with the ULT 10, and generate user interface screens consistent with embodiments of the invention.

Furthermore, the controller 130 is configured to manage the power supplied to at least a portion of the ULT 10. The ULT 10 may include, and controller 130 may be coupled to, a primary power source 192 (e.g., a source of AC power) and a backup power source 194 (e.g., at least one energy storage device, such as at least one battery or super-capacitor). When the primary power source 192 fails, at least a portion of the ULT 10 may operate using power from the backup power source 194. In this manner, the contents of the ULT 10 in the cabinet interior 16c are maintained at about a set temperature. When the primary power source 192 is restored, the controller 130 operates to switch the power supplied to the at least a portion of the ULT 10 from the backup power source 194 to the primary power source 192.

Still further, the controller 130 is configured to detect events associated with the ULT 10. For example, and not intending to be limiting, the controller 130 is configured to determine a power on event, a power off event, a power failure event, a power restored event, a door open event, a door close event, a component failure event, an injection procedure event, an interface locked event (e.g., the touchscreen 18 is locked), a user management event (e.g., a user has been added, a user has been edited, and/or a user has been deleted), a service event, an interface unlocked event (e.g., the touchscreen 18 is unlocked), a connectivity event (e.g., the controller 130 has made, lost, and/or terminated a connection with the network 182 and/or another computer 176, 178, and/or 180), a temperature event (e.g., high temperature threshold or a low temperature threshold has been reached or exceeded, or that the operating temperature has been reached), and/or a user identification entered event. In specific embodiments, the controller 130 may detect and indicate a temperature event, such as that a high temperature threshold (otherwise referred to as the "alarm temperature") has been reached or exceeded, in one of a plurality of manners. In some embodiments, the controller 130 may detect that a high temperature threshold has been reached and immediately declare such a temperature event (e.g., a high temperature threshold event, high temperature event, or "alarm temperature" event). In alternative embodiments, the controller 130 may detect that a high temperature threshold has been reached and declare a high temperature threshold event only when the high temperature threshold has been met or exceeded for a predetermined amount of time (for example, and not intending to be limiting, thirty seconds). In still further alternative embodiments, the controller 130 may detect that a high temperature threshold has been reached and declare a high temperature threshold event only when the high temperature threshold has been met or exceeded and the ULT 10 has not recovered to a particular temperature (e.g., such as an offset, or primary offset, temperature) within a predetermined amount of time (for example, and not intending to be limiting, thirty seconds).

Consistent with embodiments of the invention, FIGS. 7-34 illustrate plurality of screens that may be displayed on the user interface 18 by the controller 130 or, alternatively, on a display of a computing system in communication with the ULT 10 (such as computing system 176 and/or server 180 that includes application 190 and remotely controls the controller 130 through the network I/F 183A or serial I/F 183B, or such as computing system 176 and/or server 180 that control the controller 130 remotely, such as through application 190, through network I/F 183A, or serial I/F 183B). The screens in FIGS. 7-34 allow a user to input and view data associated with the ULT 10, as well as adjust the operations, settings, and/or functionality of the ULT 10.

Figure 7:
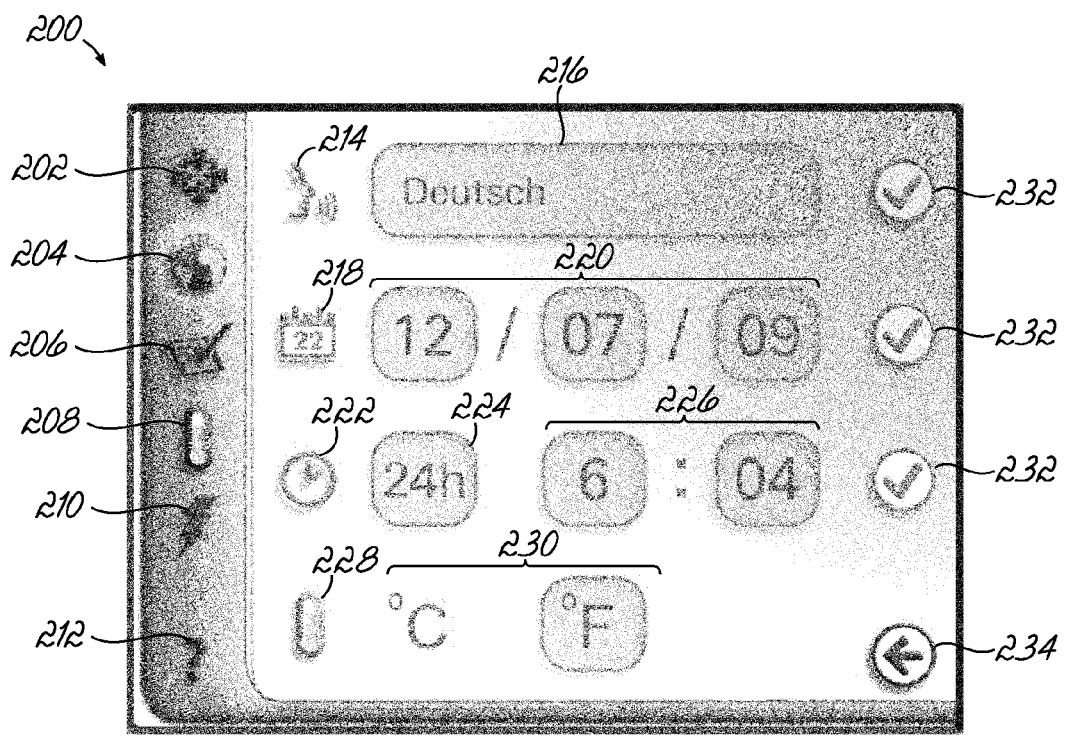
FIG. 7 is an illustration of a global configuration screen for a user to configure global settings for the ULT of FIG. 1.

FIG. 7 illustrates a global configuration screen 200 from which a user may configure global configurations of the ULT 10. In particular, the global configurations screen 200 may be displayed by the user interface 18 and include a plurality of user selectable elements, or icons, 202-212 that are reproduced on at least one other screen. The global configurations screen 200 includes a screen calibration icon 202 the user selects (e.g., on a touchscreen, with a mouse, through a command) to view a screen to calibrate the user interface 18, a global configurations icon 204 the user selects to view and/or adjust global configurations, a terms and conditions icon 206 the user selects to view information as well as terms and conditions of use for the ULT 10, a temperature set icon 208 the user selects to view and/or adjust the operating and alarm temperatures for the ULT 10, a power settings icon 210 the user selects to view and/or adjust the power operations of the ULT 10, and a help icon 212 the user selects to view help about the screen.

The global configuration screen 200 also includes a plurality of user selectable icons 214-230 that are unique to that global configuration screen. These include the user language icon 214 the user selects to activate a drop-down control 216 (for the user to select a language), a date icon 218 the user selects to activate a date selection control 220 (for the user to select a calendar date), a clock icon 222 the user selects to activate both a time mode control 224 (for the user to select that the time is either a.m. p.m., or that the time kept based on a twenty-four hour clock) as well as a time control 226 (for the user to select the current time), and a temperature icon 228 the user selects to activate a temperature control 230 (for the user to specify whether the temperature will be displayed in Celsius or Fahrenheit). After specifying the language, date, time, or temperature scale, the user may confirm their configuration by selecting a corresponding confirm entry icon 232. The global configuration screen 200 also includes a back arrow icon 234 for the user to navigate to the previously provided screen.

Figure 8:
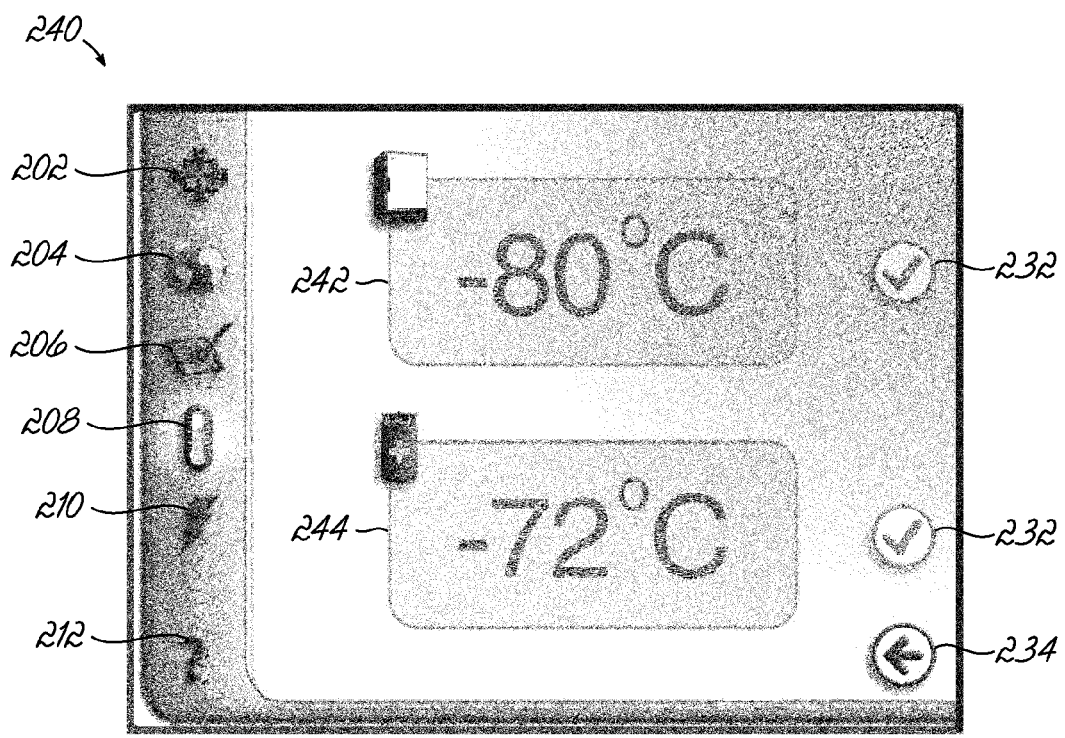
FIG. 8 is an illustration of a temperature setting screen for the user to configure temperatures associated with the ULT of FIG. 1.
Figure 9:
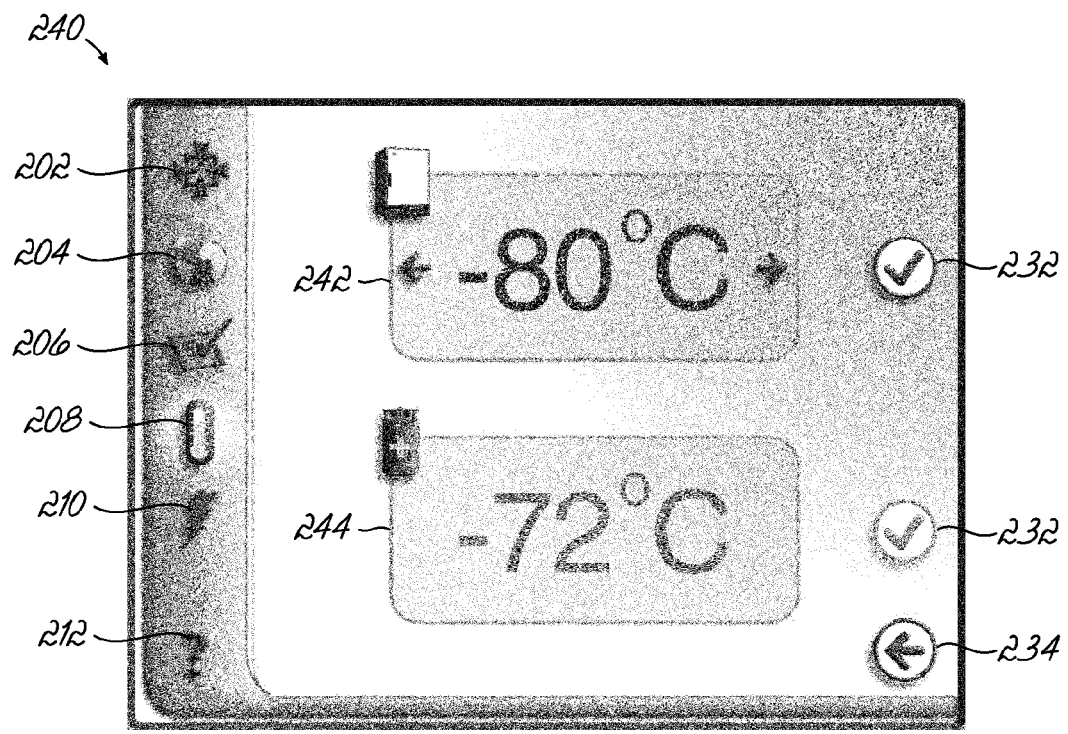
FIG. 9 is an illustration of the temperature setting screen of FIG. 8 when the user sets an operating temperature for the ULT of FIG. 1.
Figure 10:
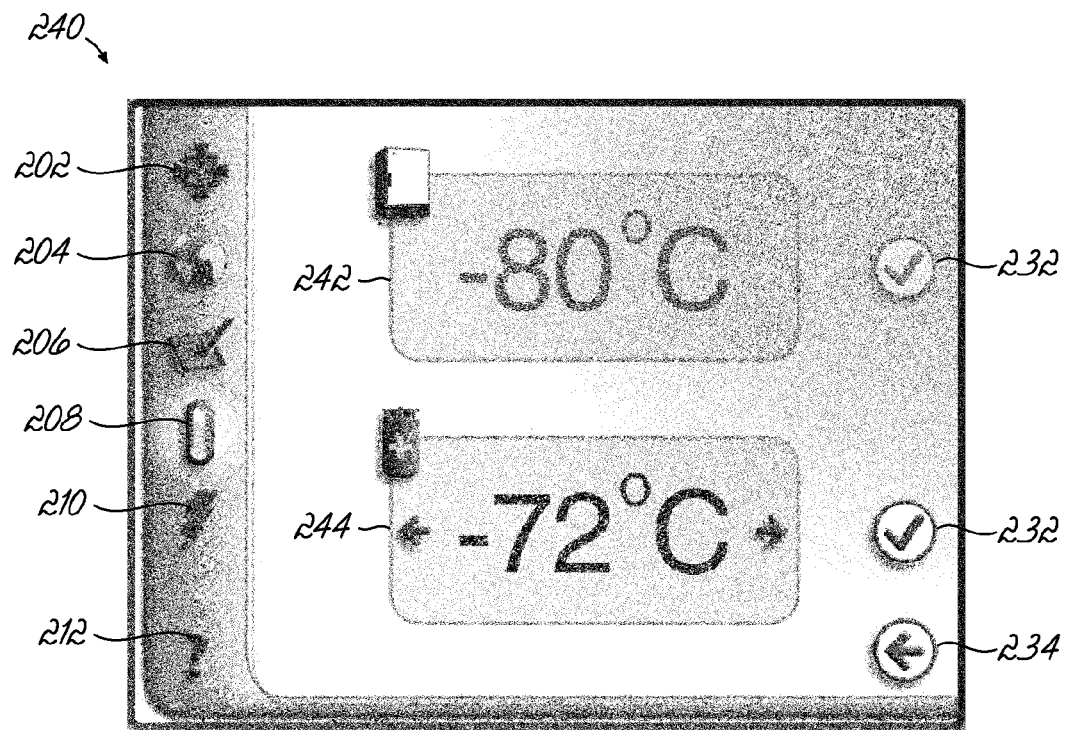
FIG. 10 is an illustration of the temperature setting screen of FIG. 8 when the user sets an alarm temperature for the ULT of FIG. 1.

In response to the user selecting the temperature set icon 208, the temperature setting screen 240 illustrated in FIG. 8 is displayed. In the temperature setting screen 240, the user may select a primary temperature control 242 to set the operating temperature (or set temperature) for the ULT 10. The operating temperature of the ULT 10 is the exemplary temperature at which the cabinet interior 16c is to be maintained. FIG. 9 illustrates the temperature setting screen 240 when the primary temperature control 242 has been activated. In the temperature setting screen 240, the user may also select a backup temperature control 244 to set an alarm temperature (or high temperature threshold) for the ULT 10 (e.g., the temperature at which an alarm is provided and/or at which an injection procedure is initiated to cool the cabinet interior 16c). FIG. 10 illustrates the temperature setting screen 240 when the backup temperature control 244 has been activated.

Figure 11:
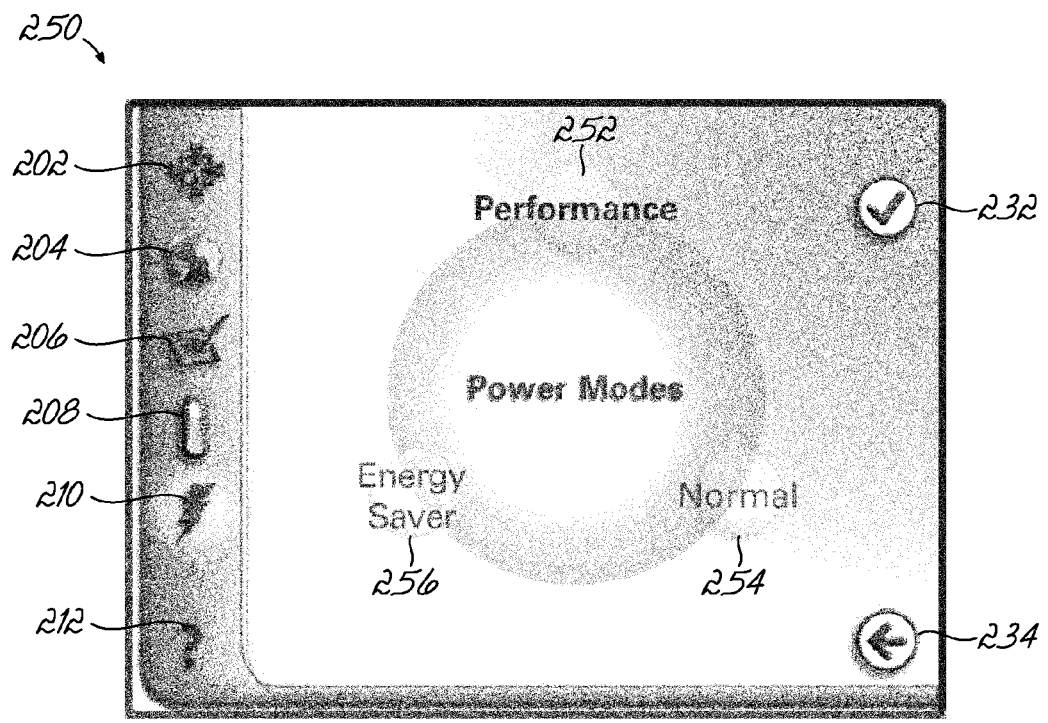
FIG. 11 is an illustration of a power mode screen for the user to configure a power mode for the ULT of FIG. 1.
Figure 12:
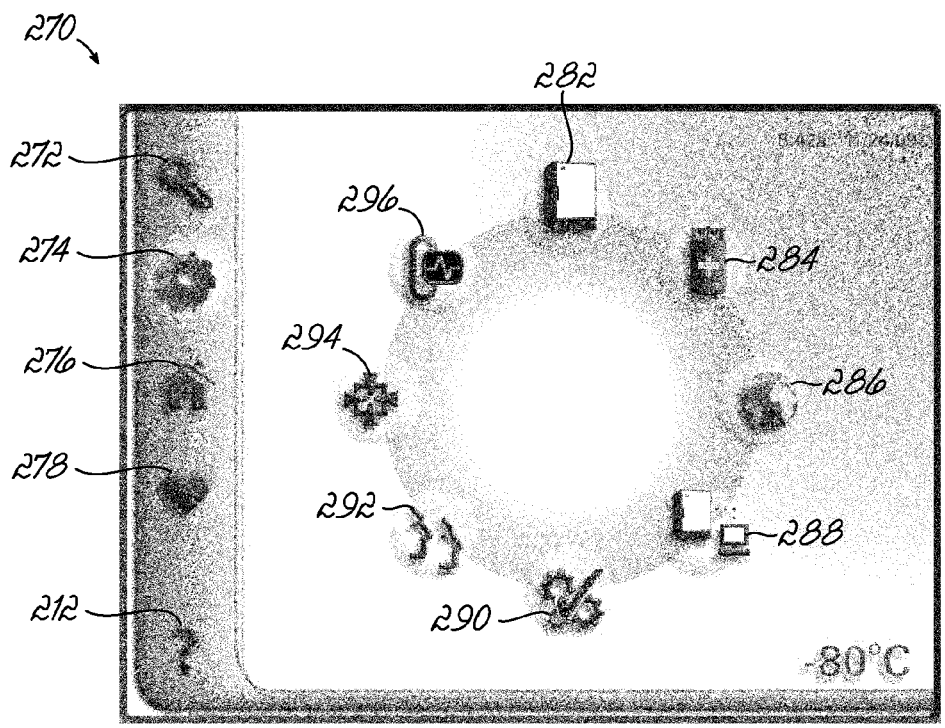
FIG. 12 is an illustration of a settings screen for the user to navigate to additional screens associated with the ULT of FIG. 1.

In response to the user selecting the power settings icon 210, the power mode screen 250 illustrated in FIG. 11 is displayed. The power mode screen 250 allows a user to select a power mode for the ULT 10. These power modes may include a performance mode (in which the ULT 10 reacts to temperature changes quickly at the expense of greater power consumption), a normal mode (in which the ULT 10 reacts to temperature changes at a normal rate with respect to normal power consumption), and an energy save mode (in which the ULT 10 reacts to temperature changes at a slightly slower rate with respect to less power consumption than in either the performance mode or the normal mode). As such, the user selects a performance mode icon 252 to activate the performance mode, the user selects a normal mode icon 254 to activate the normal mode, and the user selects an energy saver icon 256 to activate the energy saver mode.

After initial configuration (e.g., after the user interface is calibrated, the global configurations are configured, the terms and conditions have been viewed, the operating and alarm temperatures have been set, and/or the power mode has been set), and more generally when the controller 130 has been accessed after the initial configuration (e.g., such as through the touchscreen 18), the controller 130 may provide the user with a screen to enter their user name and a password (not shown). Specifically, each user may be assigned to be a particular type of user. Specific types of users include a "general" type in which the users are provided some capability to adjust the operation of the ULT 10 and view data associated therewith (but in which the users cannot view all data, screens, or add new users), an administrator type in which the users can view all data and screens as well as add new users, and a service type in which the users can view service type data for the ULT 10 (but in which the users cannot view all data, screens, or add new users). In particular, each type of user may be associated with a mode of operation of the ULT 10 while that user is logged in. For example, when the user is logged in as a general type user the ULT 10 may be in a general mode which provides access to only that data that the general user is allowed to access. Correspondingly, when the user is a service type user the ULT 10 may be in a service mode which provides access to only that data that the service user is allowed to access. It will be thus understood that at least some of the following screens illustrated in FIGS. 12-34 may not be available to at least some of the user types and/or in at least some of the modes of operation of the ULT 10. In any event, it will be understood that at least some of the following screens illustrated in FIGS. 12-34 can only be accessed when a user is logged into the ULT 10.

In some embodiments, the controller 130 may provide the user with a screen to navigate to various additional screens to view information associated with the ULT 10. In particular, the controller 130 provides a settings screen 270 illustrated in FIG. 12 that provides a centralized point for the user to view and/or adjust settings of the ULT 10, as well as to view information associated with the ULT 10. The settings screen 270 includes a lock icon 272 the user selects to lock the user interface 18, a settings icon 274 the user selects to navigate to the settings screen 270, a home icon 276 the user selects to access a home screen that indicates the interior cabinet temperature and/or events associated with the ULT 10, as well as a general health icon 278 the user selects to access detailed status data associated with the ULT 10. As illustrated, the general health icon 278 is in the shape of a heart and may indicate, through its color or alternative graphical representation, whether the ULT 10 is operating acceptably and/or at an acceptable temperature.

As illustrated, the settings screen 270 further includes a freezer settings icon 282 the user selects to view and/or adjust temperature and time settings, a backup settings icon 284 the user selects to view and/or adjust backup settings (e.g., settings for the injector system 160 of the ULT 10), a global settings icon 286 the user selects to view and/or adjust global configurations (e.g. such as those illustrated in FIG. 7), a connectivity icon 288 the user selects to view and/or adjust connectivity settings, a preferences icon 290 the user selects to view and/or adjust preferences, a user management icon 292 the user selects to view and/or adjust user information, a calibration icon 294 the user selects to calibrate the user interface 18, and a system health icon 296 the user selects to view temperature, event, and/or other data associated with the ULT 10.

Figure 13:
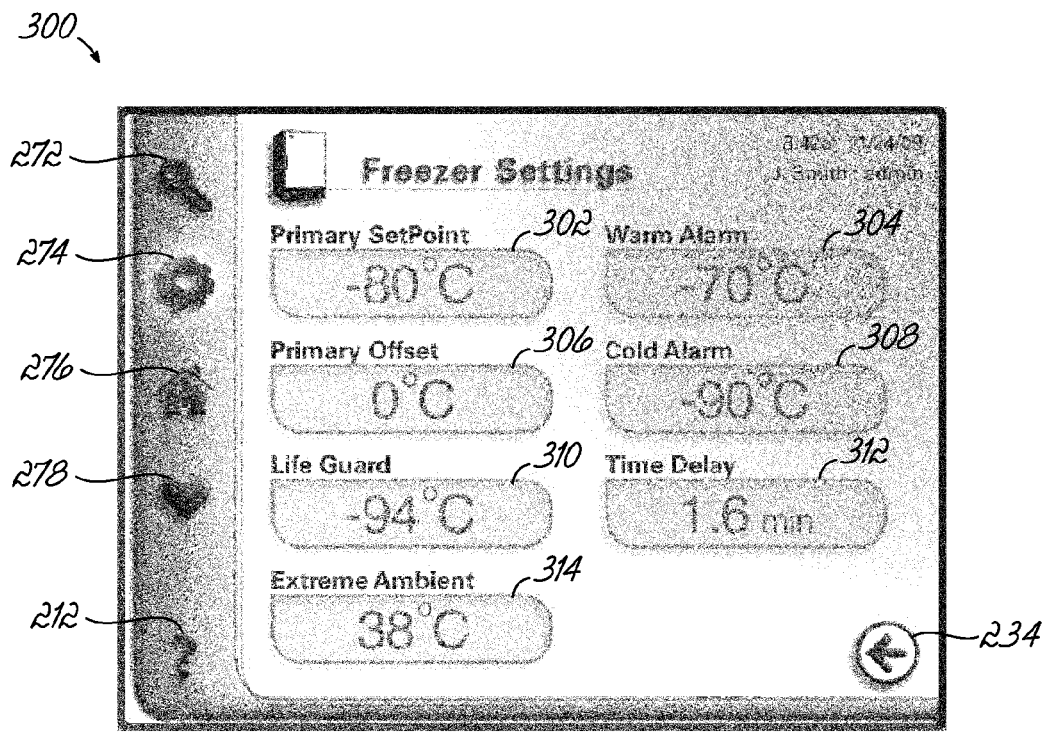
FIG. 13 is an illustration of a freezer settings screen for the user to view and/or adjust temperature and time settings associated with the ULT of FIG. 1.

FIG. 13 illustrates a freezer settings screen 300 that is provided in response to the user selecting the freezer settings icon 282 of the settings screen 280. The freezer settings screen 300 allows the user to view and/or adjust temperature and time settings associated with the ULT 10. The freezer settings screen 300 includes a primary setpoint temperature control 302 the user selects to adjust the operating temperature for the ULT 10, a warm alarm setpoint temperature control 304 the user selects to adjust the alarm temperature for the ULT 10, a primary offset temperature control 306 the user selects to adjust a primary offset temperature for the ULT 10 (e.g., a temperature offset for the ULT 10 that indicates the variance from the alarm temperature that the ULT 10 must reach within a certain amount of time to prevent an alarm temperature event), a cold alarm setpoint temperature control 308 the user selects to adjust a cold alarm temperature (or low temperature threshold) for the ULT 10 (e.g., a temperature at which a cold alarm is provided), a life guard temperature control 310 the user selects to adjust a life guard temperature for the ULT 10 (e.g., a temperature associated with the compressor 70 of the second stage 26 that is indicative of a problem with lubrication of that compressor 70), and a time delay control 312 the user selects to adjust the time delay for the ULT 10 to recover from a loss of power, and an ambient temperature indicator 314 that indicates the ambient temperature of the environment outside the ULT 10. In alternative embodiments, the time delay control 312 may be replaced with a random time delay control (not shown) in which the user specifies that the ULT 10 is to use a random time delay to recover from a loss of power. Specifically, the random time delay control may query as to the number of ULTs 10 used at a facility (e.g., the user may select an exemplary number of ULTs 10 used by the facility, such as twenty, forty, or some alternative number). In response to user input, the random time delay control may determine how long a range of time to select the random time delay from. For example, if the user indicates that the facility includes about twenty ULTs 10, the ULT 10 may select a random time from a range of between about 0-15 minutes as a time delay. However, if the user indicates that the facility includes about forty ULTs 10, the ULT 10 may select a random time from a range of between about 0-30 minutes as a time delay. If other ULTs 10 are also configured in a like manner, the time delays for the ULTs 10 should be spread at least partially across the range of time specified by the number of ULTs 10 indicated by the user. It will be appreciated by one having ordinary skill in the art that, although there is no such thing as a purely "random" function, embodiments of the invention may include and/or use any number of pseudorandom algorithms known in the art that are in turn used to select a random time.

Figure 14:
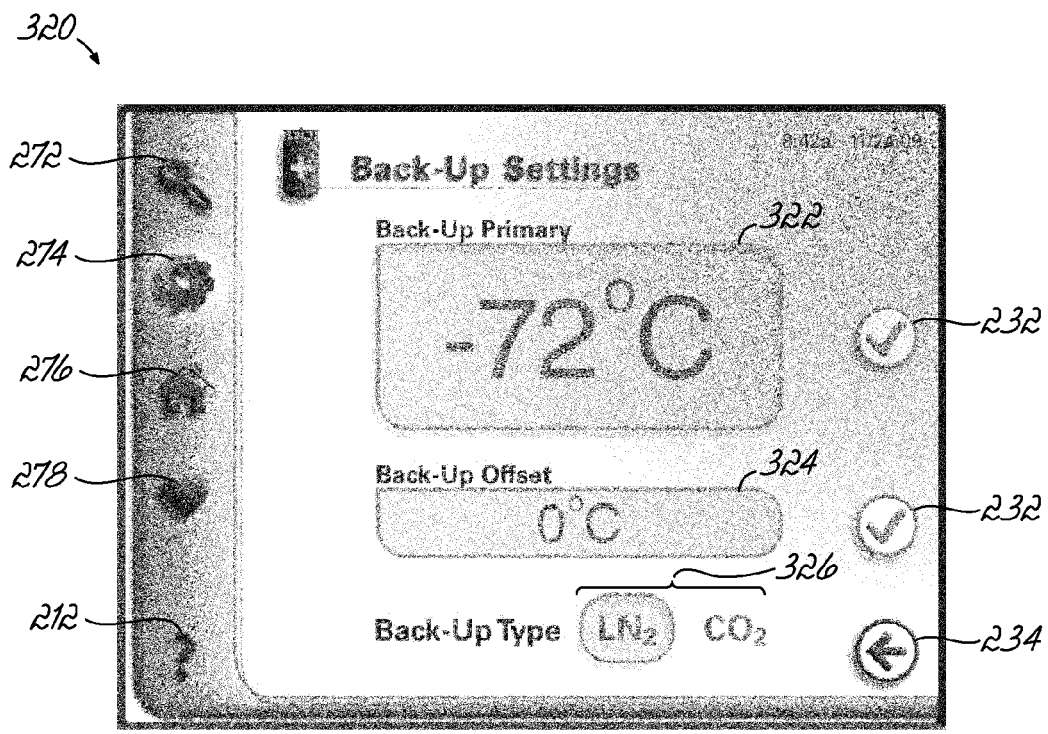
FIG. 14 is an illustration of a backup settings screen for the user to view and/or adjust backup settings associated with the ULT of FIG. 1.

FIG. 14 illustrates a backup settings screen 320 that is provided in response to the user selecting the backup settings icon 284 of the settings screen 280. The backup settings screen 320 allows the user to view and/or adjust backup settings associated with the injector system 160. The backup settings screen 320 includes a backup primary temperature control 322 the user selects to adjust an injection procedure temperature for the injection system 160 to perform an injection procedure (which may or may not be the same as the alarm temperature), a backup offset temperature control 324 the user selects to adjust a backup offset temperature for the injection system 160 (e.g., a temperature offset for the injection system 160 that indicates the variance allowed from the injection procedure temperature before the injector system 160 performs an injection procedure), and an injection procedure refrigerant control 326 for the user to select a refrigerant for the injection system 160 to inject during an injection procedure.

Figure 15:
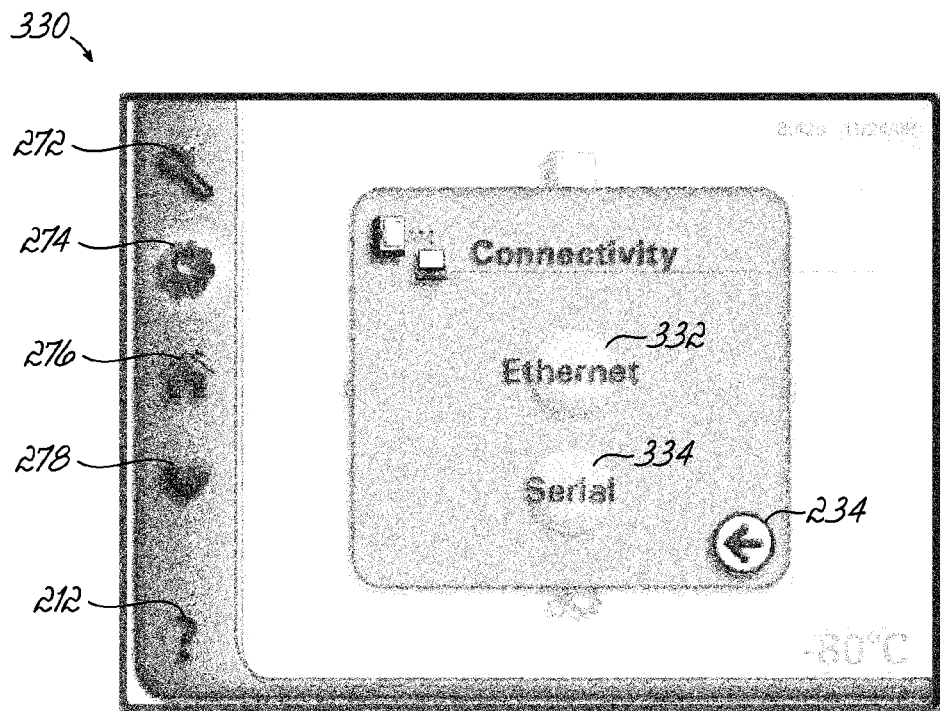
FIG. 15 is an illustration of a connectivity screen for the user to configure or choose a method of communication associated with the ULT of FIG. 1.

FIG. 15 illustrates a connectivity settings screen 330 that is provided in response to the user selecting the connectivity icon 288 of the settings screen 280. The connectivity setting screen 330 allows the user to choose whether to use Ethernet or serial communications. The connectivity settings screen 330 includes an Ethernet icon 332 the user selects to view and/or adjust Ethernet connection settings. The connectivity settings screen 330 also includes a serial icon 334 the user selects to view and/or adjust serial connection settings.

Figure 16:
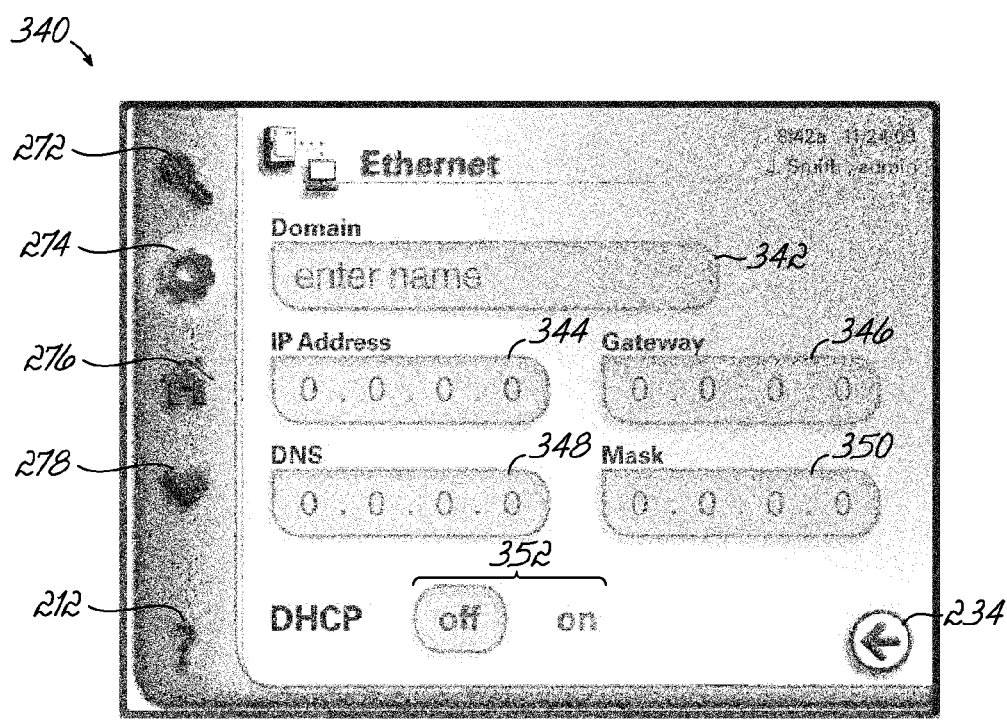
FIG. 16 is an illustration of an Ethernet settings screen for the user to configure Ethernet communication settings associated with the ULT of FIG. 1.

FIG. 16 illustrates an Ethernet settings screen 340 that is provided in response to the user selecting the Ethernet icon 332 of the connectivity settings screen 330. The Ethernet settings screen 340 allows the user to view and/or adjust Ethernet connection settings. The Ethernet settings screen 340 includes a domain control 342 the user selects to enter a domain for Ethernet communications, an IP address control 344 the user selects to enter an IP address for the ULT 10, a gateway control 346 the user selects to enter a gateway for the ULT 10, a DNS control 348 the user selects to enter a DNS server address for the ULT 10, a mask control 350 the user selects to enter a subnetwork for the ULT 10, and a DHCP control 352 from which the user may activate or deactivate DHCP for the ULT 10. In some embodiments and in response to user selection of the domain control 342, the IP address control 344, the gateway control 346, the DNS control 348, and/or the mask control 350, the controller 130 provides an on-screen QWERTY keyboard that the user may use to enter the domain, IP address, gateway, DNS server address, and/or subnetwork for the ULT 10. In alternative embodiments, and in response to user selection of the IP address control 344, the gateway control 346, the DNS control 348, and/or the mask control 350, the controller 130 provides an on-screen numeric pad that the user may utilize to enter the numbers for the IP address, gateway, DNS server address, and/or subnetwork for the ULT 10.

Figure 17:
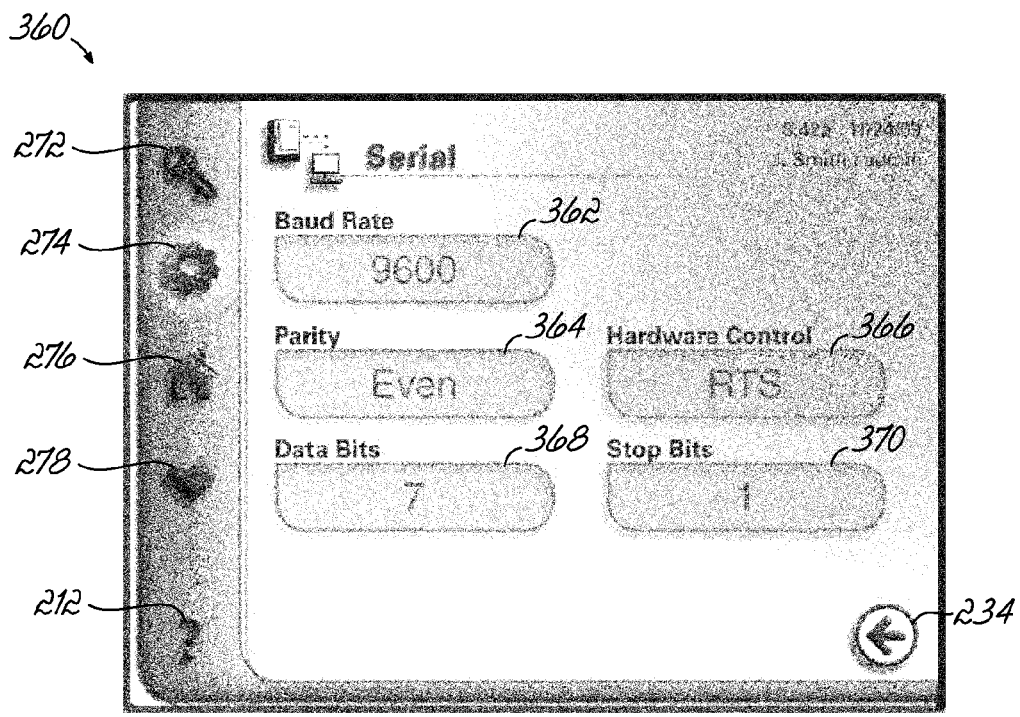
FIG. 17 is an illustration of a serial settings screen for the user to configure serial communication settings associated with the ULT of FIG. 1.

FIG. 17 illustrates a serial settings screen 360 that is provided in response to the user selecting the serial icon 334 of the connectivity settings screen 330. The serial settings screen 360 allows the user to view and/or adjust serial connection settings. The serial settings screen 360 includes a baud rate control 362 the user selects to configure the speed for serial communications, a parity control 364 the user selects to configure the type of parity for serial communications, a hardware control 366 the user selects to configure the type of hardware control to use for serial communications (if any), a data bits control 368 the user selects to configure the number of data bits to use for serial communications, and a stop bits control 370 the user selects to configure the number of stop bits to use for serial communications.

Figure 18:
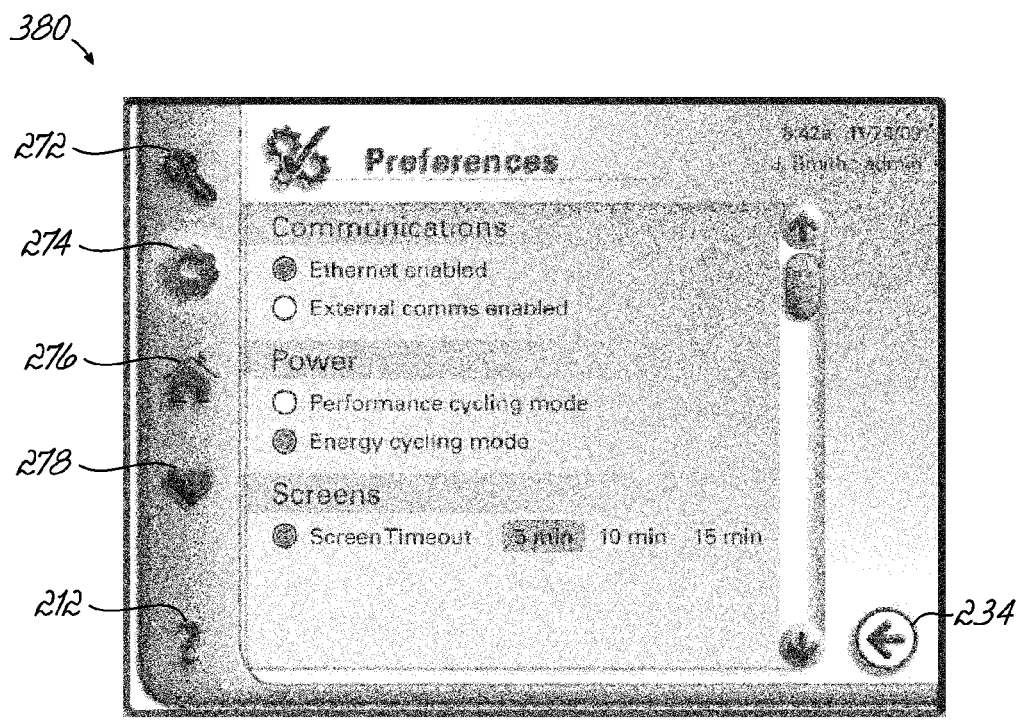
FIG. 18 is an illustration of a preferences screen for the user to view and/or adjust preferences associated with the ULT of FIG. 1.

FIG. 18 is an illustration of a preferences screen 380 that is provided in response to the user selecting the preferences icon 290 of the settings screen 280. The preferences screen 380 allows the user to view and/or adjust preferences associated with the ULT 10, including whether communications are enabled, a power mode for the ULT 10, the timeout for the user interface 18, as well as other preferences associated with the ULT 10.

Figure 19:
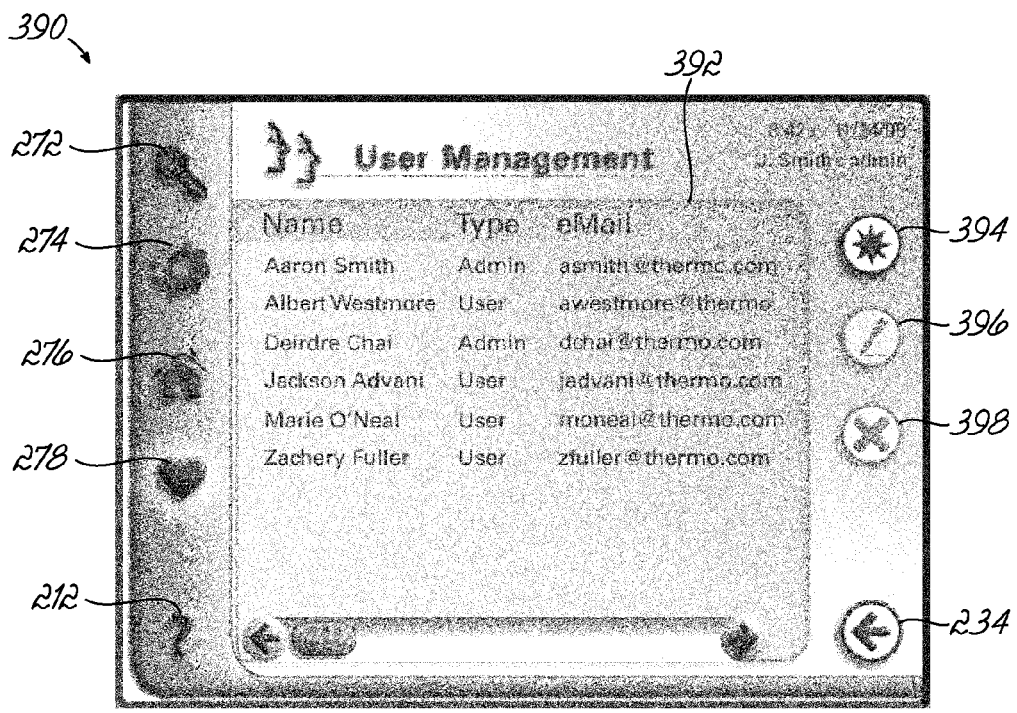
FIG. 19 is an illustration of a user management screen for the user to manage users of the ULT of FIG. 1.

FIG. 19 is an illustration of a user management screen 390 that is provided in response to the user selecting the user management icon 292 of the settings screen 280. The user management screen 390 allows the user to view and/or adjust user information. The user management screen 390 includes a user selection control 392 that indicates the users authorized for the ULT 10 as well as information associated therewith. A user may also select a user listed in the user selection control 392 and adjust data associated therewith or delete that selected user entirely. The user management screen 390 also includes a user creation icon 394 the user selects to create a new user for the ULT 10, a user edit icon 396 the user selects to adjust information associated with a selected user, and a user deletion icon 398 the user selects to delete a selected user.

Figure 20:
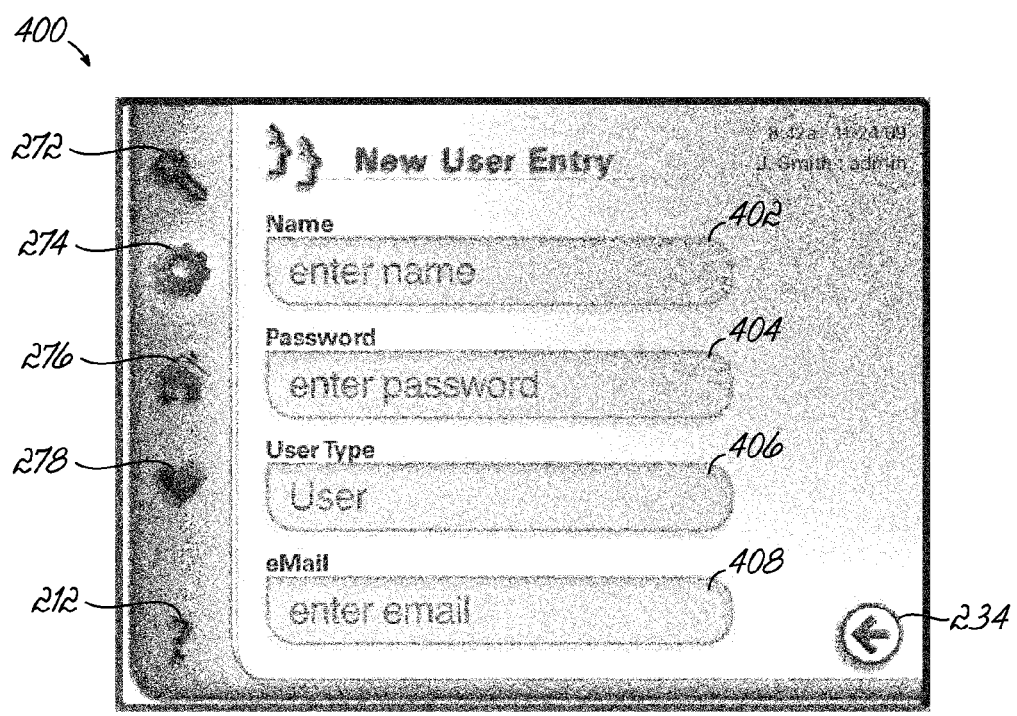
FIG. 20 is an illustration of a new user data entry screen for the user to input data associated with a new user of the ULT of FIG. 1.

FIG. 20 is an illustration of a new user data entry screen 400 that is provided in response to the user selecting the user creation icon 394 of user management screen 390. The new user data entry screen 400 allows the user to enter data associated with a new user. The new user data entry screen 400 includes a name control 402 the user selects to enter a new user's name, a password control 404 the user selects to enter a new user's password, a user type control 406 the user selects to specify what type of user the new user is (e.g., administrator or user), as well as an e-mail control 408 the user selects to specify the new user's e-mail address. In some embodiments and in response to user selection of the name control 402, the password control 404, and/or the e-mail control 408, the controller 130 provides an on-screen QWERTY keyboard that the user may use to enter the user name, user password, and/or user e-mail.

One having ordinary skill in the art will appreciate that the controls 402-408 included in the new user data entry screen 400 may be utilized in a user data adjustment screen (not shown) to adjust information associated with a selected user. As such, the user data adjustment screen may include the controls 402-408 but with at least some data in at least one of the controls 402-408 already filled in. The user may thus select a particular control 402-408 to adjust the data for the selected user.

Figure 21:
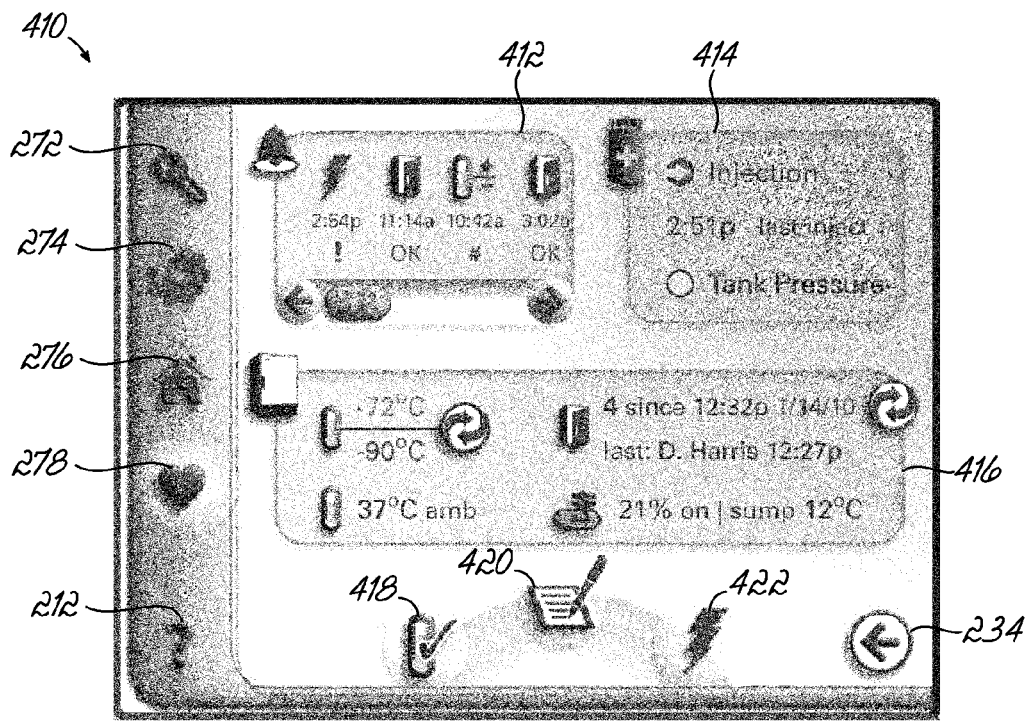
FIG. 21 is an illustration of a system health screen for the user to view information associated with the ULT of FIG. 1.

FIG. 21 is an illustration of a system health screen 410 that is provided in response to the user selecting the system health icon 296 of the settings screen 280. Alternatively, the system health screen 410 is provided in response to the user selecting the general health icon 278. The system health screen 410 allows the user to view general data about the operation of the ULT 10 as well as more specific data regarding temperature sensors, events, and/or power operation. The system health screen 410 includes an event summary control 412 that indicates all events associated with the ULT 10 in chronological order, a backup system information control 414 that indicates the status of the injector system 160 as well as the time of the last injection, and a system data control 416 that indicates the alarm temperature, the cold alarm temperature, the ambient temperature, the last door open event (as well as the time and/or user associated therewith), and/or the condition the first stage 24 and/or second stage 26. Additionally, the system health screen 410 includes a sensor data icon 418 the user selects to view information about sensors in the ULT 10, an event log icon 420 the user selects to view an event log, and a power systems icon 422 the user selects to view power system information.

Figure 22A:
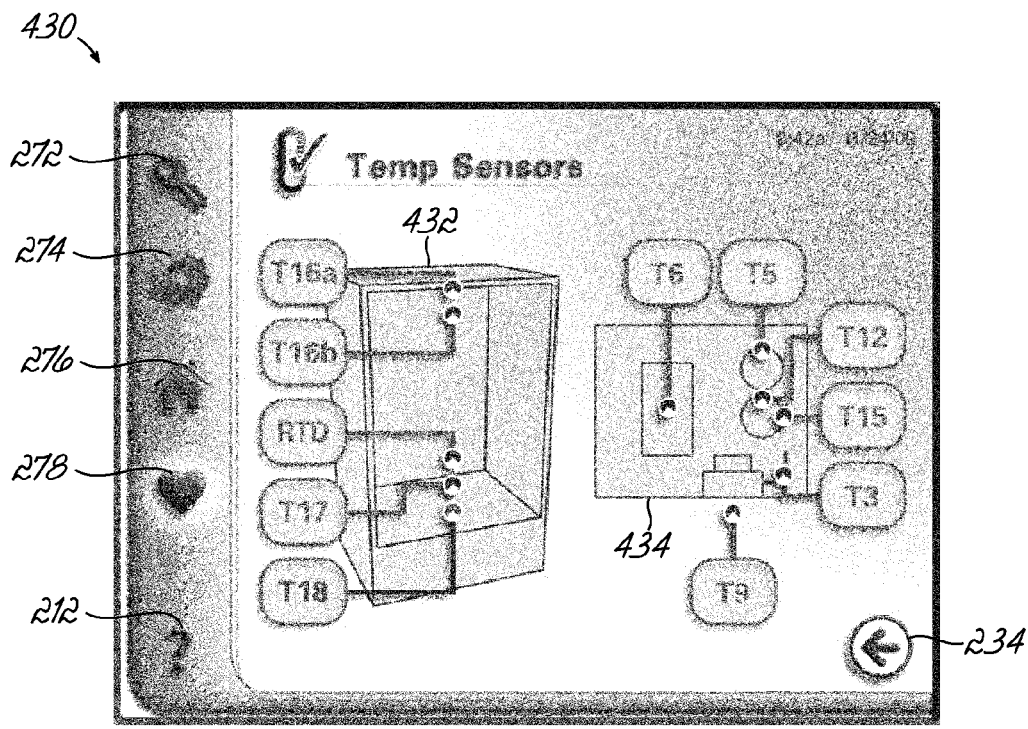
FIG. 22A is an illustration of a sensor data screen for the user to view information about sensors associated with the ULT of FIG. 1.

FIG. 22A is a sensor data screen 430 that may be provided in response to the user selecting the sensor data icon 418 of the system health screen 410. The sensor data screen 430 includes at least one wireframe representation of the ULT 10 as at 432 and/or 434 (e.g., as illustrated in FIG. 22A, at least one wireframe representation 432 and/or 434 with hidden line removal as is known in the art). The sensor data screen 430 further includes representations associated with at least one sensor within the ULT 10, and in particular includes representations that illustrate the general location of each at least one sensor within the ULT 10. In some embodiments, the sensor representations displayed with the wireframe representation 432 are in turn associated with evaporator and/or cabinet interior sensors, while the sensor representations displayed with the wireframe representation 434 are in turn associated with first stage sensors, second stage sensors, and/or an ambient temperature sensor. In specific embodiments, each of the sensor representations is associated with a color and/or other indication that generally identifies either the temperature detected by the temperature sensor and/or the state of that temperature sensor (e.g., when the temperature or state is acceptable the color is green, if the temperature or state is somewhat unacceptable the color is yellow, if the temperature or state is unacceptable the color is red). For example, if a temperature sensor is not detected for a slight period of time or the temperature is approaching the alarm temperature, a color associated with the corresponding sensor representation may change to yellow. Correspondingly, if a temperature sensor has not been detected for a predetermined period of time or the temperature has reached or exceeded the alarm temperature, a color associated with the corresponding temperature representation may change to red.

Figure 22B:
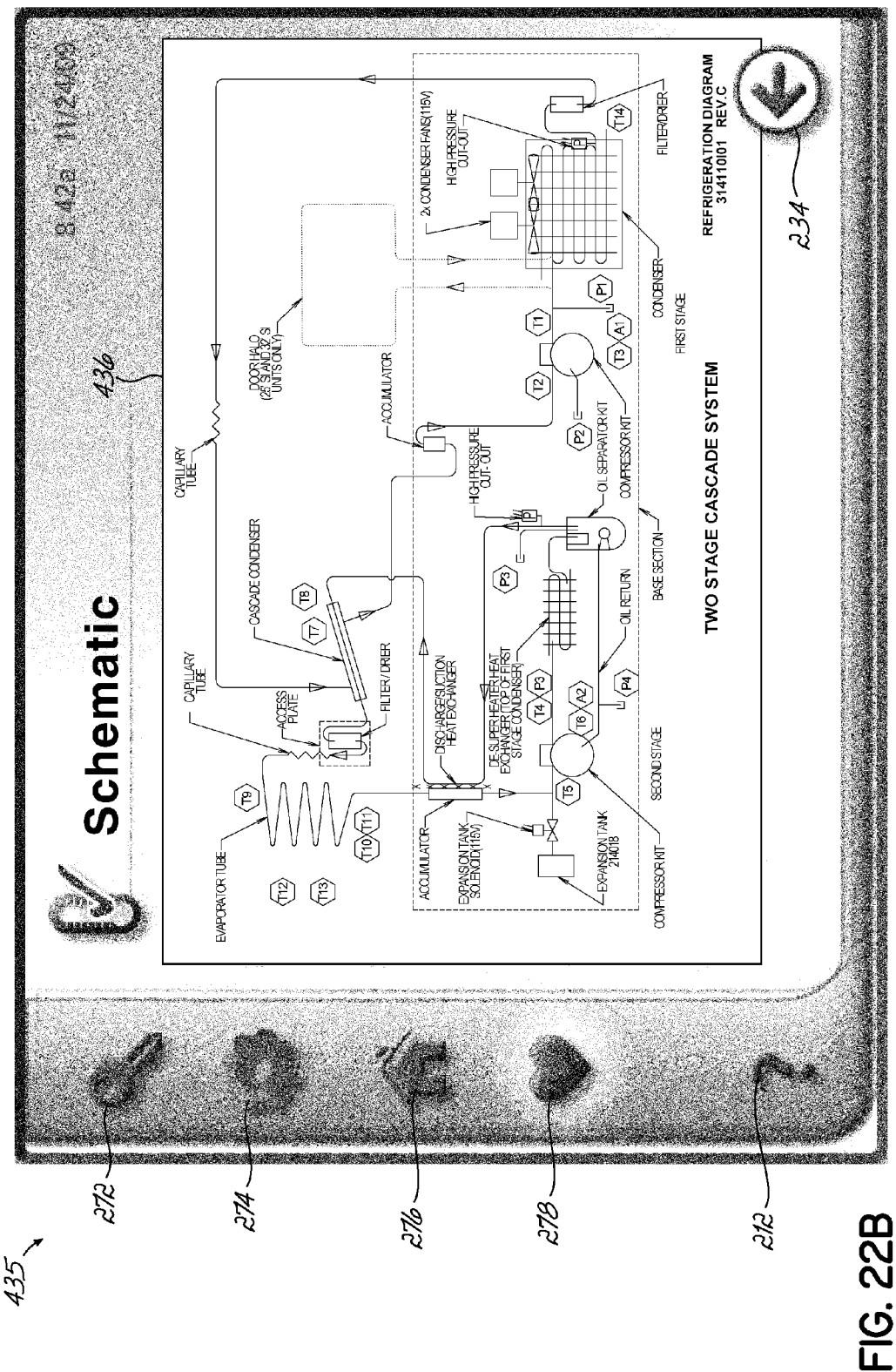
FIG. 22B is an illustration of a schematic data screen for the user to view information about one or more components associated with the ULT of FIG. 1.

FIG. 22B is a schematic data screen 435 that may be provided in response to the user selecting the sensor data icon 418 of the system health screen 410, and particularly when the user is a service technician and the ULT 10 is in a service mode. The schematic data screen 435 includes at least one schematic of at least a portion of the ULT 10 as at 436. The schematic data screen 435 further includes representations associated with at least one component or section associated with the ULT 10. In specific embodiments, each of the representations is associated with a color and/or other indication that generally identifies either the temperature of the component as detected by a temperature sensor and/or the state of that component (e.g., when the temperature or state is acceptable the color is green, if the temperature or state is somewhat unacceptable the color is yellow, if the temperature or state is unacceptable the color is red). For example, if a particular component is not detected for a slight period of time or the temperature of that component is approaching some predetermined temperature, a color associated with the corresponding component representation may change to yellow. Correspondingly, if a particular component has failed or has not been detected for a predetermined period of time or the temperature associated with that component has reached or exceeded a predetermined temperature, a color associated with the corresponding component representation may change to red.

Figure 23:
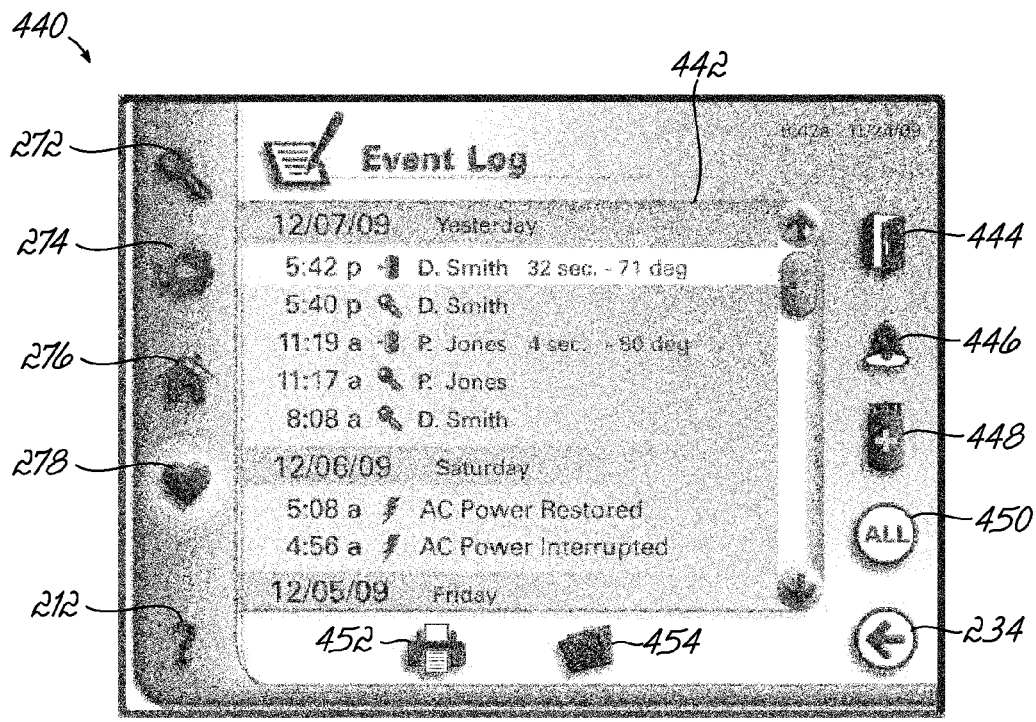
FIG. 23 is an illustration of an event log screen for the user to view and/or sort events associated with the ULT of FIG. 1.

FIG. 23 is an event log screen 440 that is provided in response to the user selecting the event log icon 420 of the system health screen 410. The event log screen 440 provides a sortable list of events associated with the ULT 10. The event log screen 440 includes an event log control 442 that lists events of the ULT 10 chronologically. The event log screen also includes a plurality of icons that the user selects to sort the events in the event log control 442. In particular, the event log screen 440 includes a door open event icon 444 the user selects to view door open events, an alarm event icon 446 the user selects to view when the alarm temperature has been reached, a backup event icon 448 the user selects to view injection procedures by the injector system 160, and an all icon 450 the user selects to view all events. Although not shown, it will be appreciated that the event log screen 440 may include additional icons that the user may select to sort the event log control 442. For example, these additional icons may include a lock event icon (not shown) the user selects to view all lock events (e.g., a user locking or unlocking the user interface 18) as well as a power event icon (not shown) the user selects to view all power events (e.g., loss and restoration of primary power).

In addition to sorting by events themselves, the event log screen 440 may include additional filters to sort by both a category for an event and an event type for the events. For example, categories of events could be user events (e.g., events caused by users), administrator events (e.g., events associated with user management), and service events (e.g., events associated with maintenance or service of the ULT 10, including events associated with a service mode of the ULT 10). For example, Table 1 illustrates several categories and event types that a user may use to filter the list of events.

TABLE 1

Event Categories, Event Types, and Examples

| Category | Event Type | Example(s) |
| --- | --- | --- |
| User | Alarms | Alarm Temperature, Cold Alarm Temperature, Door Ajar (not associated with user), Low Battery, etc. |
| | Door | Door Open (by user), Door Close (by user), etc. |
| Administrator | User Management | User Added, User Edited, User Deleted, Password Changed, etc. |
| | Injector System | $LN_2/CO_2$ Injection Initiated, $LN_2/CO_2$ Injection Over, Injector System Refrigerant Set, Injector System Injection Temperature Set, etc. |
| Service | Buck/Boost | Buck, Boos, Normal, Out of Range Post Condition, etc. |
| | Comp Trending Warm | Temperature Trending Warm (but not yet reached alarm temperature or injection temperature) |

In alternative embodiments, the events listed in the event log screen 440 may be automatically filtered based on the type of user that is viewing the event log screen 440. For example, if the user is a service type user, the event log control 442 may display only service type events. Correspondingly, if the user is a general type user, the event log control 442 may display only general user type events.

As illustrated in FIG. 23, the event log screen 440 also includes a print icon 452 the user selects to print a selected event, selected events, or an entire event log to paper (e.g., through a printer attached to the ULT 10 or through the network 182) or to store the selected event, selected events, or entire event log to an event log data file (e.g., such as in a file, and in particular in a comma-separated-value format file that is readable by a spreadsheet application, such as the Excel® spreadsheet application as developed by Microsoft® Corporation of Redmond, Wash.). The event log screen 440 further includes a file browser icon 454 the user selects to view files stored on the ULT 10 or media connected to the ULT 10.

Figure 24:
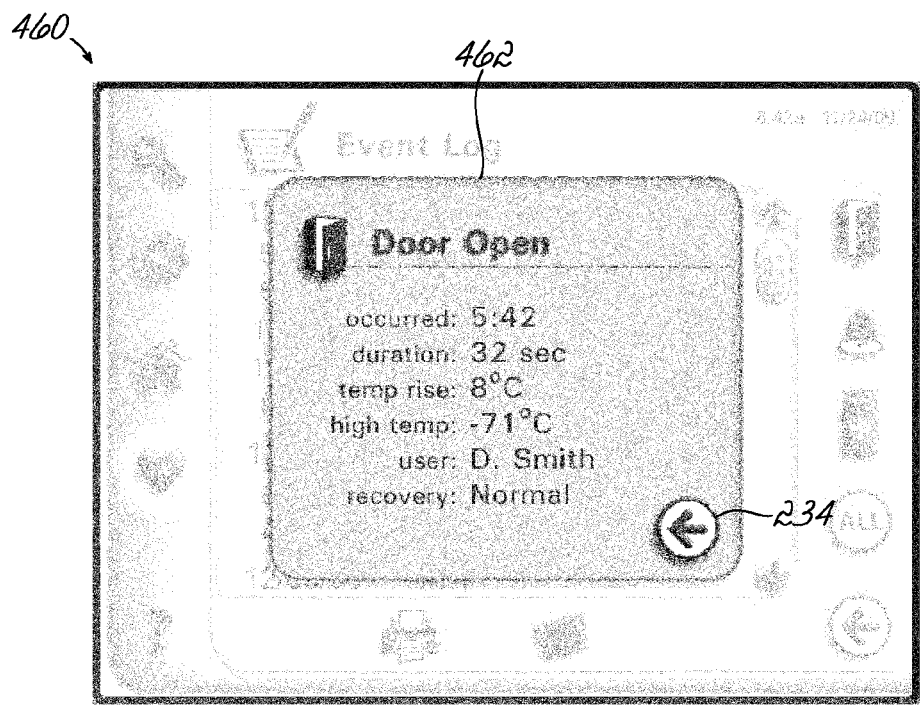
FIG. 24 is an illustration of an event log detail screen that indicates information associated with a specific event illustrated in the event log screen of FIG. 23.

In some embodiments, each of the events in the event log control 442 is a selectable event. Specifically, the user may select a particular event for a more detailed view of the information associated with that particular event. For example, FIG. 24 is an illustration of an event log detail screen 460 that is provided in response to a user selecting an event from the event log control 442 from the event log screen 400. The event log detail screen 460 includes an event detail window 462 to display detailed information associated with the selected event, including the time the event occurred, the duration of the event, the rise in temperature associated with the event (if applicable), the cabinet interior temperature reached in response to the event (if applicable), the time of recovery from the event, the user associated with the event (if applicable), whether the recovery from the event required special operations (e.g., whether an injection procedure was required or that the recovery proceeded as normal), as well as other event information.

Figure 25:
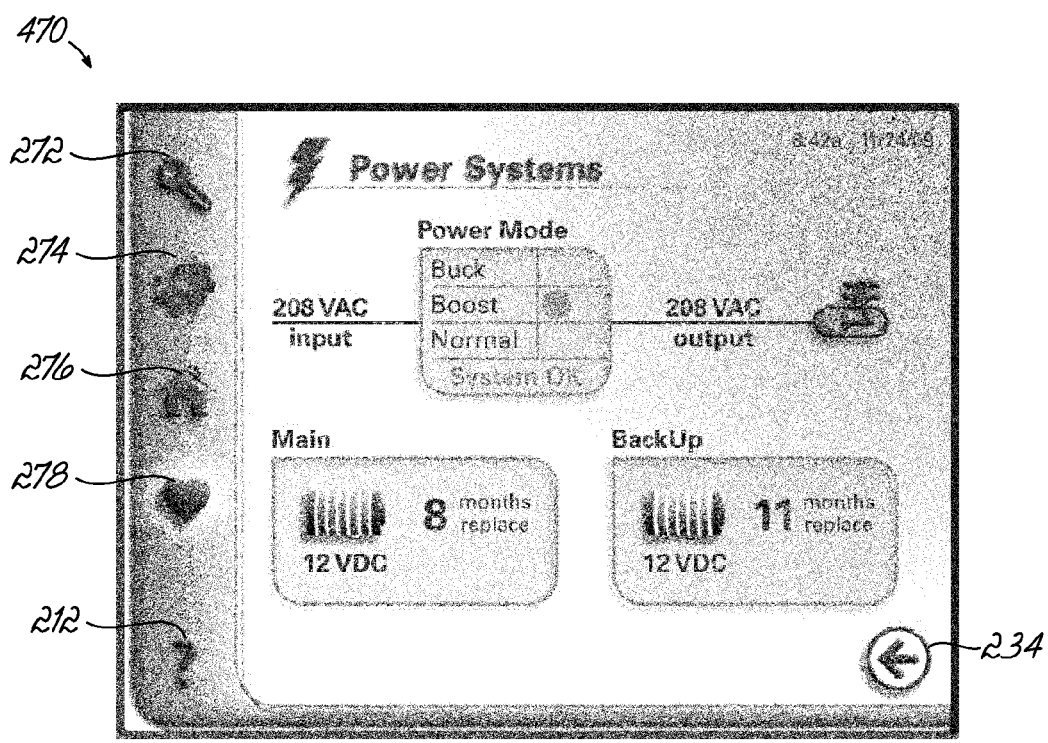
FIG. 25 is an illustration of a power systems screen for the user to view information about power systems associated with the ULT of FIG. 1.

FIG. 25 is an illustration of a power systems screen 470 that is provided in response to the user selecting the power systems icon 422 of the system health screen 410. The power systems screen 470 provides an indication of the power mode of the ULT 10 as well as the status of the primary power source 192 and the backup power source 194. As illustrated in FIG. 25, the power systems screen 470 illustrates the level and estimated replacement time for both a main battery and a backup battery of the backup power source 194.

Figure 26:
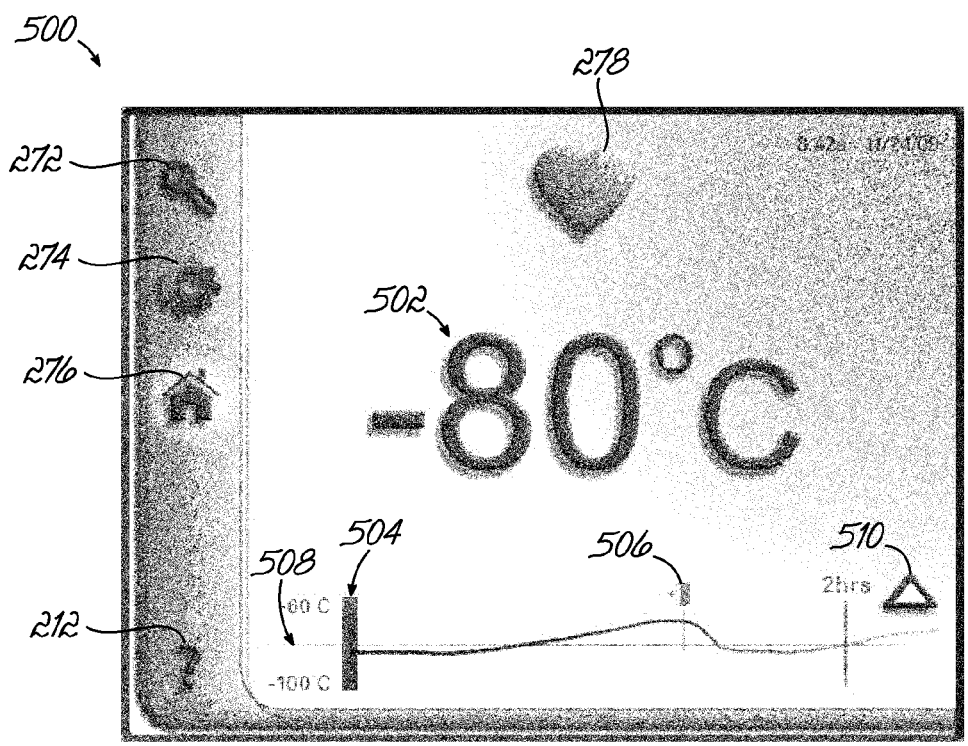
FIG. 26 is an illustration of a home screen for the user to view cabinet interior temperature and at least one event associated with the ULT of FIG. 1 and occurring during a predetermined amount of time.

FIG. 26 is an illustration of a home screen 500 that is provided in response to the user selecting the home icon 276. The home screen 500 indicates the current cabinet interior temperature of the ULT 10 as well as at least one event associated with the ULT 10 during a predetermined period of time. The home screen 500 includes an indication of the current cabinet interior temperature as at 502 and a line graph 504 that indicates the cabinet interior temperature occurring during a predetermined period of time (e.g., with temperature on the vertical axis and time on the horizontal axis), as well as any events associated with the ULT 10 occurring during that predetermined period of time. In particular, events occurring during the predetermined period of time are indicated on the line graph 504 at their respective time with a user selectable icon 506. As illustrated in FIG. 26, the event was a door open event. Thus, the user selectable icon 506 generally resembles a door being opened. A user may select the user selectable icon 506 to view information about the associated event. The line graph 504 further illustrates the operating temperature of the ULT 10 as at 508.

Figure 27:
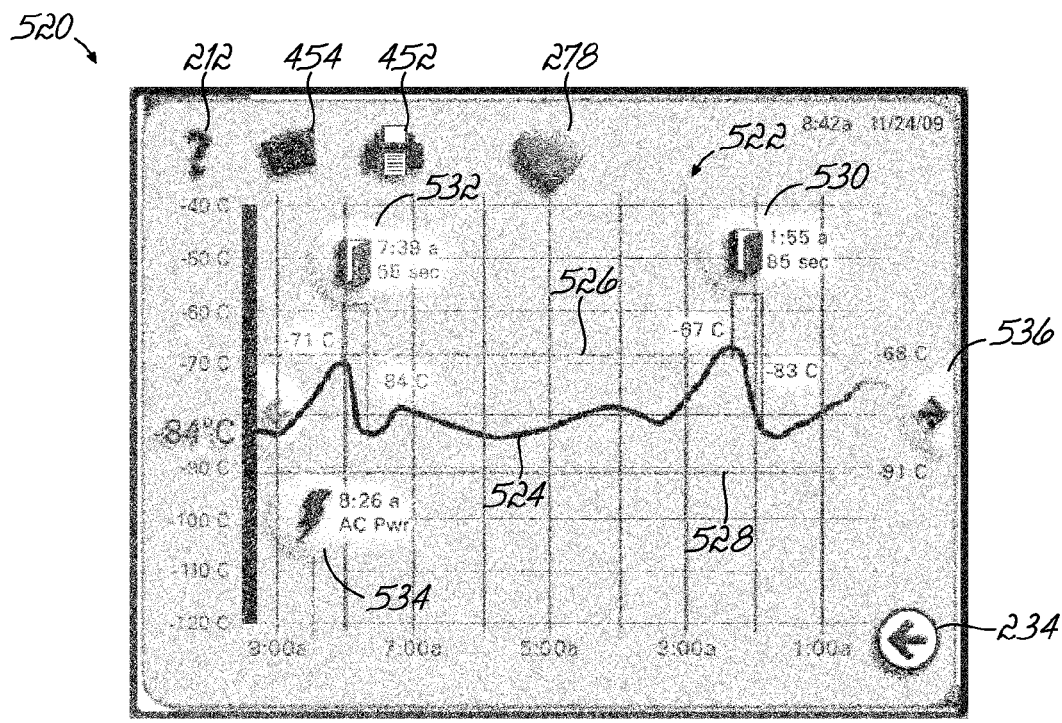
FIG. 27 is an illustration of an expanded line graph screen for the user to view cabinet interior temperature and at least one event associated with the ULT of FIG. 1 and occurring during a predetermined amount of time.

In addition to the status and information displays and icons, the home screen 500 also includes an expansion icon 510 that the user selects to expand the line graph 504. FIG. 27 is an illustration of an expanded line graph screen 520 that is provided in response to the user selecting the expansion icon 510 of the home screen 500. The expanded line graph screen 520 illustrates an expanded line graph 522 (e.g., with temperature on the vertical axis and time on the horizontal axis) that not only indicates the cabinet interior temperature over a predetermined period of time as at 524 but also indicates the alarm temperature with a line as at 526 (namely, −68 C) and the cold alarm temperature with a line as at 528 (namely, −91 C). In this manner, the cabinet interior temperature over time may be viewed with relation to both the alarm temperature and the cold alarm temperature. In some embodiments, the expanded line graph screen 520 further illustrates the operating temperature on the "Y" axis (not shown) or through another line (not shown), and may still further illustrate the current cabinet interior temperature as on the "Y" axis and/or through another line (not shown).

The expanded line graph screen 520 further illustrates events occurring during the predetermined period of time on the expanded line graph 522. As illustrated in FIG. 27, the expanded line graph screen 520 illustrates three events, namely a first door open event associated with a first door open event icon 530, a second door open event associated with a second door open event icon 532, and a power failure event associated with a power failure icon 534. Specifically, each event icon in the expanded line graph screen 520 is associated with the time of the event as well as the duration of the event. Each event in the expanded line graph screen 520 is also associated with the cabinet interior temperature at the time of the event as well as the maximum cabinet interior temperature reached due to the event. The expanded line graph screen 520 also includes a more data icon 536 the user selects to view cabinet interior temperature and/or events associated with the ULT 10 older than those currently shown.

Figure 28:
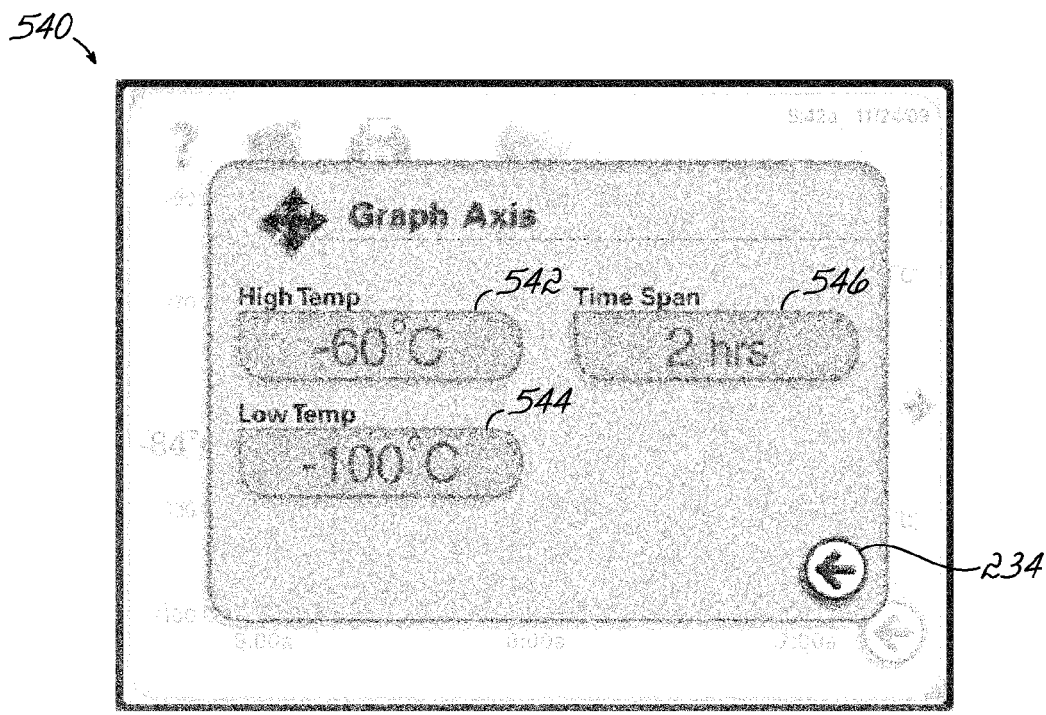
FIG. 28 is an illustration of a graph axis screen for the user to adjust parameters for the home screen of FIG. 26 or the expanded line graph screen of FIG. 27.
Figure 29:
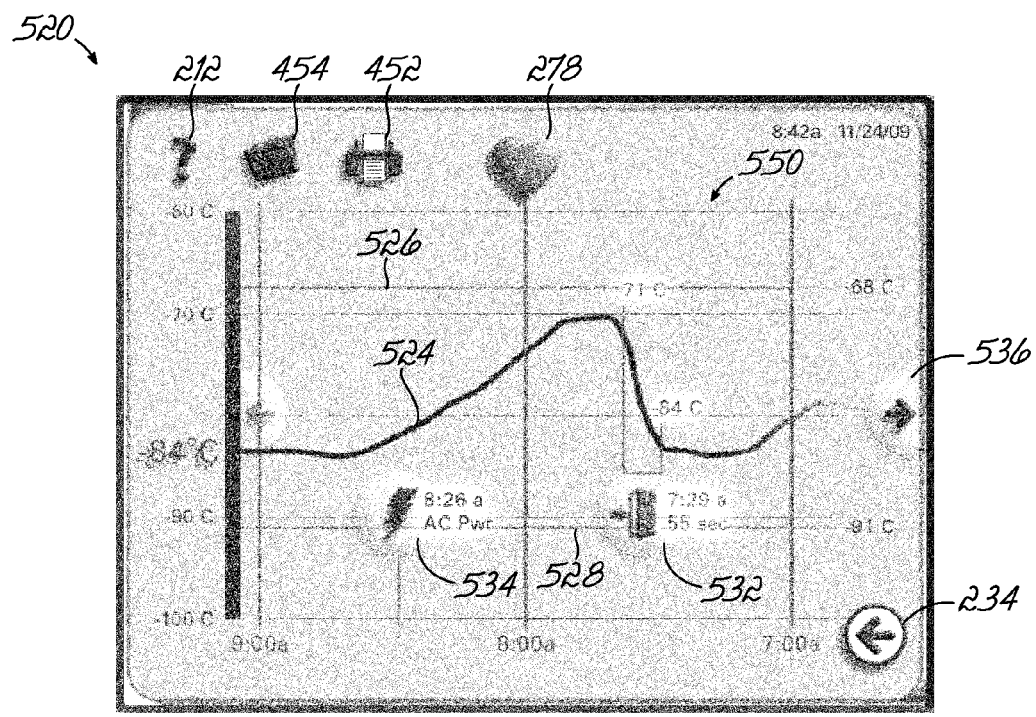
FIG. 29 is an illustration of the expanded line graph screen of FIG. 27 after adjustments to parameters illustrated in FIG. 28.

As illustrated in FIG. 27, the expanded line graph 522 indicates the cabinet interior temperature and events associated with the ULT 10 occurring over about eight hours. Also as illustrated in FIG. 27, the range of temperatures for the expanded line graph 522 to indicate cabinet interior temperature and events associated with the ULT 10 is from about −40 C to about −120 C. In some embodiments, a user specifies both an alternative period of time and an alternative temperature range over which to view the cabinet interior temperature and events associated with the ULT 10. FIG. 28 is an illustration of a graph axis screen 540 in which the user may specify the period of time and the temperature range over which to view the cabinet interior temperature and events associated with the ULT 10. In particular, the graph axis screen 540 includes a high temperature control 542 the user selects to modify the high temperature for the expanded line graph 522, a low temperature control 544 the user selects to modify the low temperature for the expanded line graph 522, and a time span control 546 the user selects to modify the time span of the expanded line graph 522. FIG. 29 is an illustration of the expanded line graph screen 520 that includes a re-sized expanded line graph 550 consistent with the settings specified in the graph axis screen 540 of FIG. 28.

Figure 30:
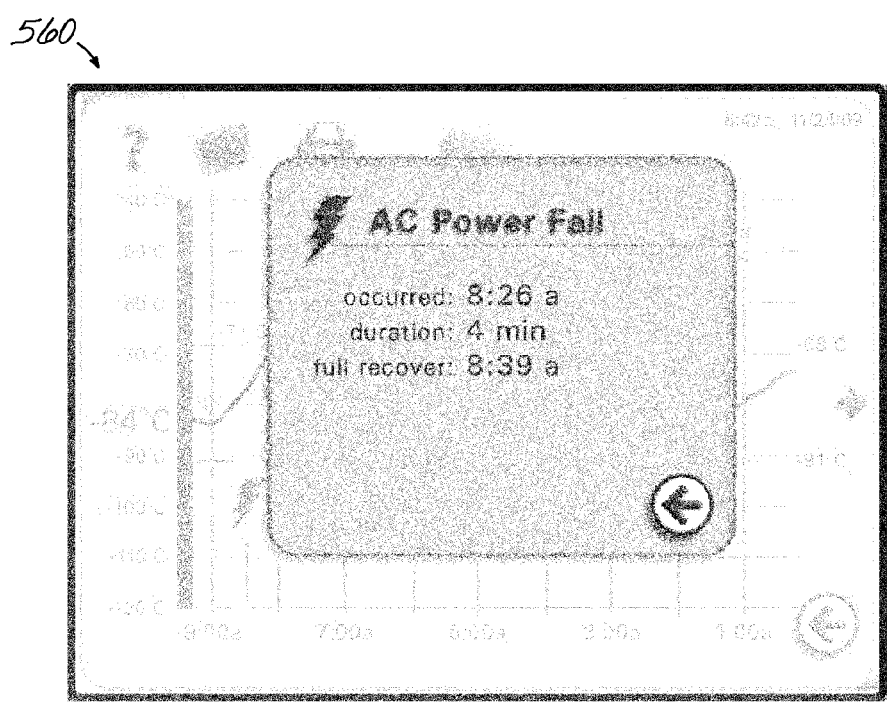
FIG. 30 is an illustration of a first graph event screen that indicates information about an event after selection of a user selectable icon associated with that event on the home screen of FIG. 26 or the expanded line graph screen of FIG. 27.
Figure 31:
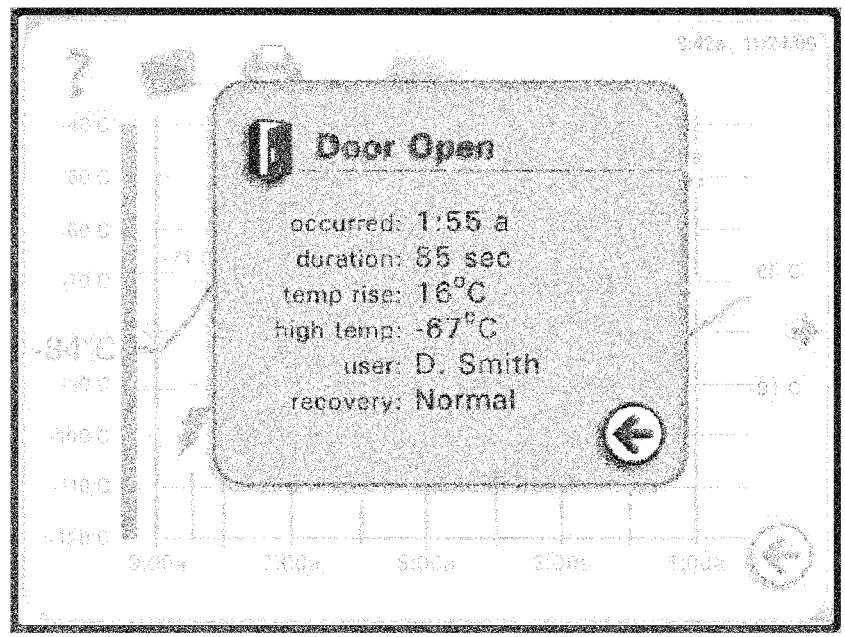
FIG. 31 is an illustration of a second graph event screen that indicates information about an event after selection of a user selectable icon associated with that event on the home screen of FIG. 26 or the expanded line graph screen of FIG. 27.

Returning to FIG. 27, the expanded line graph 522 includes events that occurred over the predetermined period of time, each of which is associated with an icon 530-534. In specific embodiments, each of the icons 530-534 is a user selectable icon that indicate additional information associated with that event when selected by the user. For example, FIG. 30 is an illustration of an graph event screen 560 that is provided in response to the user selecting the power failure icon 534 of the expanded line graph screen 520, while FIG. 31 is an illustration of a graph event screen 570 that is provided in response to the user selecting the door open event icon 530 of the expanded line graph screen 520. Similar to the event log detail screen 460 of FIG. 24, the graph event screen 560 of FIG. 30 and the graph event screen 570 of FIG. 31 display detailed information associated with a selected event.

Returning to FIG. 27, in some embodiments, the user may select a time span using the time span control 546 of FIG. 28 in which it is difficult to provide an icon for each event (e.g., such as the icons 530-534). As such, the expanded line graph screen 520 may illustrate just the line graph of the temperature over that time span without an icon for each event. In those embodiments, each event may not be illustrated or may be illustrated through a vertical line through the line graph at their corresponding time.

As illustrated in FIG. 27, the expanded line graph screen 520 includes the print icon 452 the user selects to print at least a portion of the expanded line graph 522 (e.g., through a printer attached to the ULT 10 or through the network 182) or to store data associated with that portion of the expanded line graph 522 in an expanded line graph image file or an expanded line graph data file. In particular, the expanded line graph image file may include an image of the portion of the expanded line graph 522 (e.g., such as an image in the jpeg file format as developed by the Joint Photographic Experts Group), while the expanded line graph data file may include the data that the expanded line graph 522 is generated from (e.g., such as in a file, and in particular in a comma-separated-value formatted file that is readable by a spreadsheet application, such as the Excel® spreadsheet application).

Figure 32:
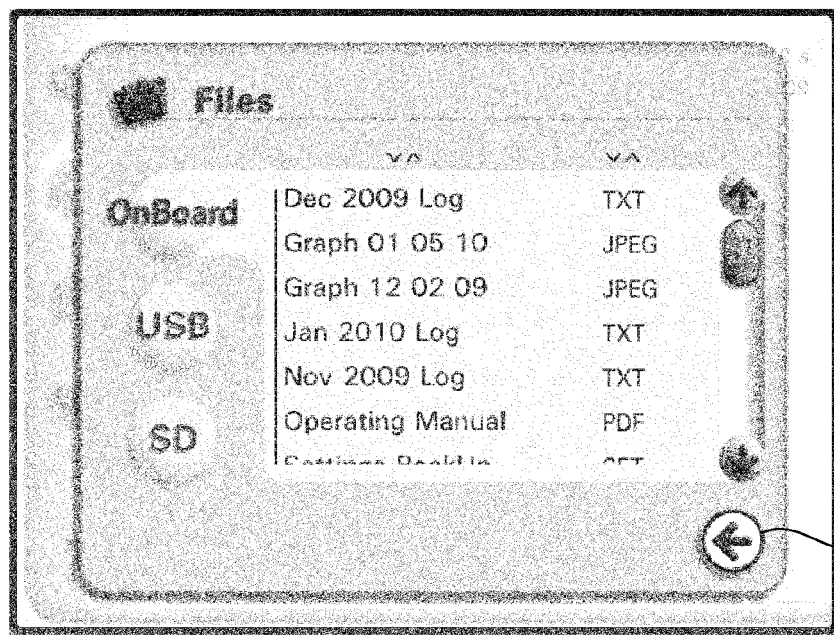
FIG. 32 is an illustration of a file browser screen for the user to view files stored on the ULT of FIG. 1.
Figure 33:
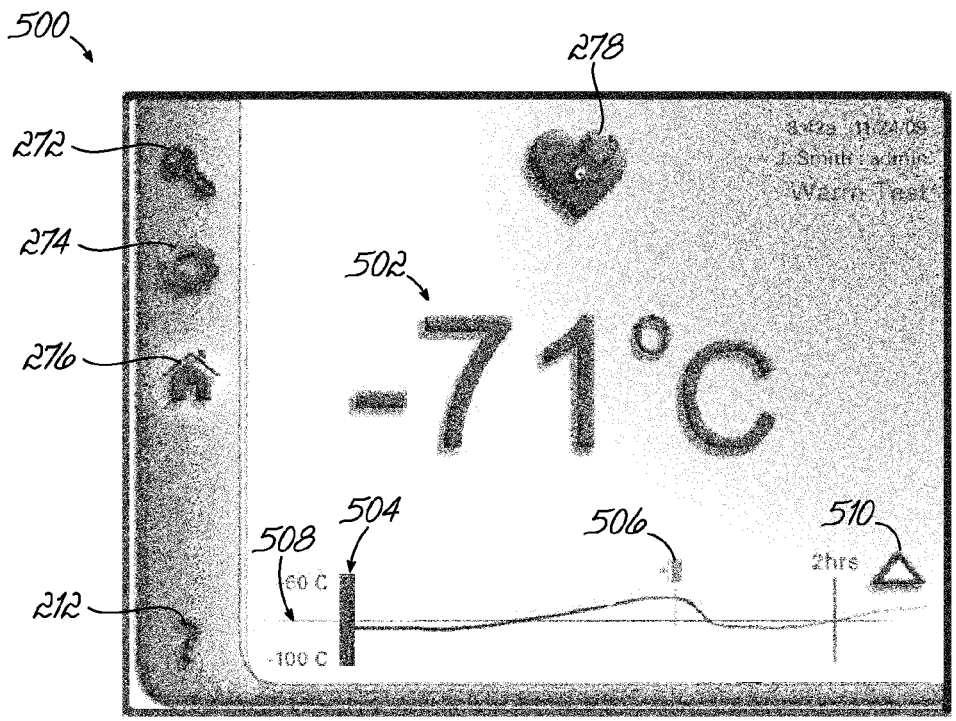
FIG. 33 is an illustration of an alternative embodiment of the home screen of FIG. 26.

The expanded line graph screen 520 further includes the file browser icon 454 the user selects to view files stored on the ULT 10 or media connected to the ULT 10. FIG. 32 is an illustration of a file browser screen 580 for the user to view files (e.g., event log data files, expanded line graph image files, or expanded line graph data files) that are on the ULT 10 or on media attached to the ULT 10. The file browser screen 580 includes a list of files that indicate which files are in the memory 172 or mass storage 174 of the ULT 10 (in response to the user selecting the onboard icon 582) as well as files that are stored in removable memory (not shown) in communication with the controller 130. Specifically, the removable memory may include a USB storage device (not shown) in communication with the controller 130 (accessed in response to the insertion of the USB storage device and the user selecting the USB icon 584) or an SD card (not shown) in communication with the controller 130 (accessed in response to the insertion of the SD card and the user selecting the SD icon 586). The removable memory, in turn, may include a file that can be uploaded to the controller 130, such as new or otherwise updated program code for the controller 130 (e.g., a new operating system 188 or application 190), a background image for the touchscreen, a personalized menu structure (e.g., such as images to include in each of the screen to personalize the screens for the particular user), new and/or updated manuals, and/or additional files to upload to the controller 130.

Returning to FIG. 26 and as discussed above, the general health icon 278 is in the shape of a heart and may indicate, through its color or alternative graphical representation, whether the ULT 10 is operating acceptably and/or at an acceptable temperature. In some embodiments, such as that illustrated in FIG. 33, the general health icon 278 may display an alternative graphical representation (e.g., as illustrated, a heart with a stethoscope superimposed thereupon) when the cabinet interior temperature is near or at an alarm temperature.

Figure 34:
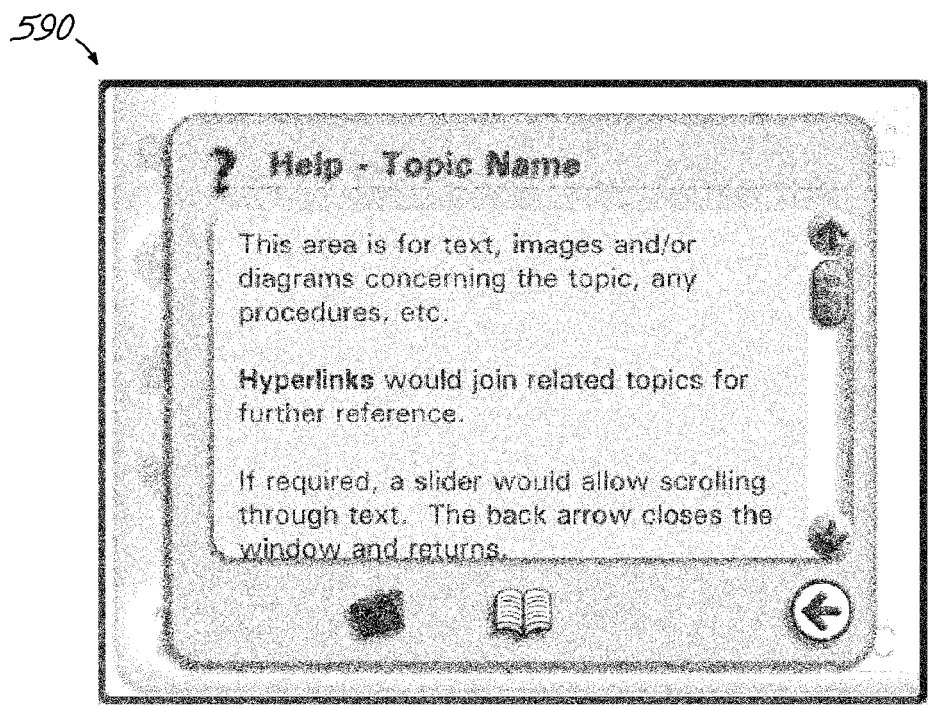
FIG. 34 is an illustration of a help screen that indicates context relevant data associated with a screen in turn associated with the ULT of FIG. 1.

The help icon 212 is included in several of the screens illustrated in FIGS. 7-33. In some embodiments, textual help is provided to the user that is specific to the screen from which the user selected the help icon 212. FIG. 34 is an illustration of a help screen 590 in which a user may view context relevant data, such as textual help, associated with the screen from which the help icon 212 was selected.

Figure 2:
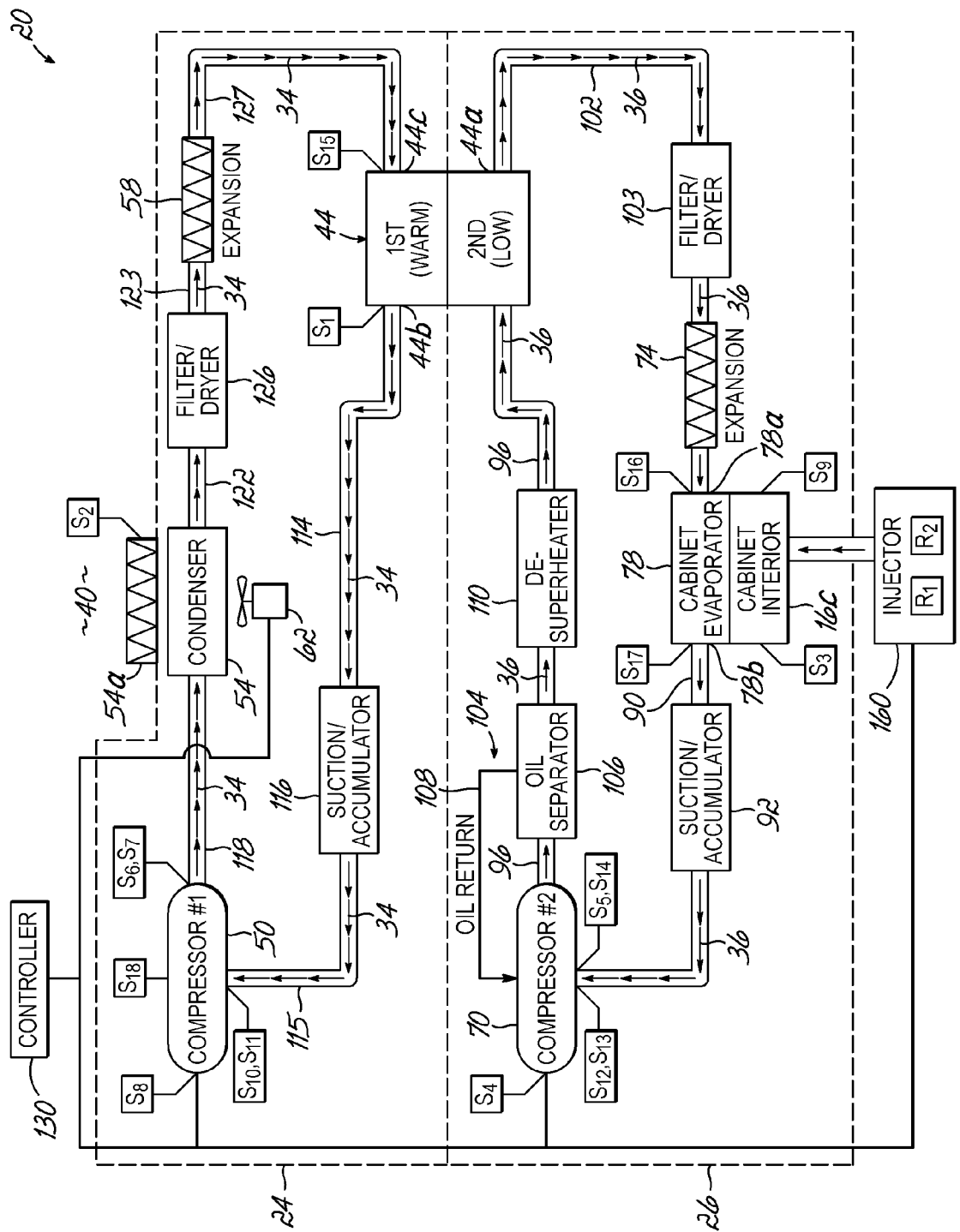
FIG. 2 is a schematic representation of a refrigeration unit used with the ULT of FIG. 1.
Figure 3:
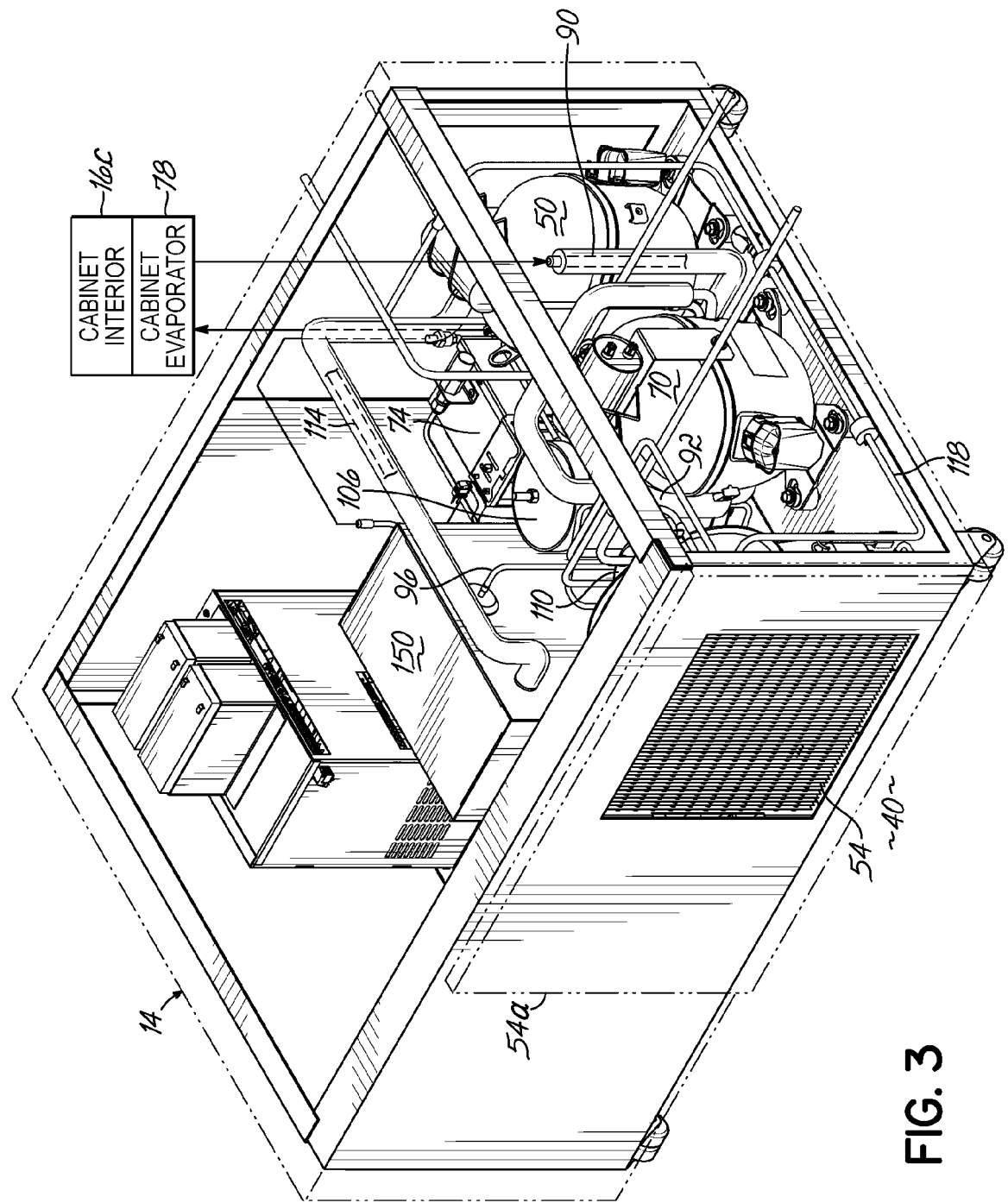
FIG. 3 is a perspective view of a deck of the ULT of FIG. 1.
Figure 4:
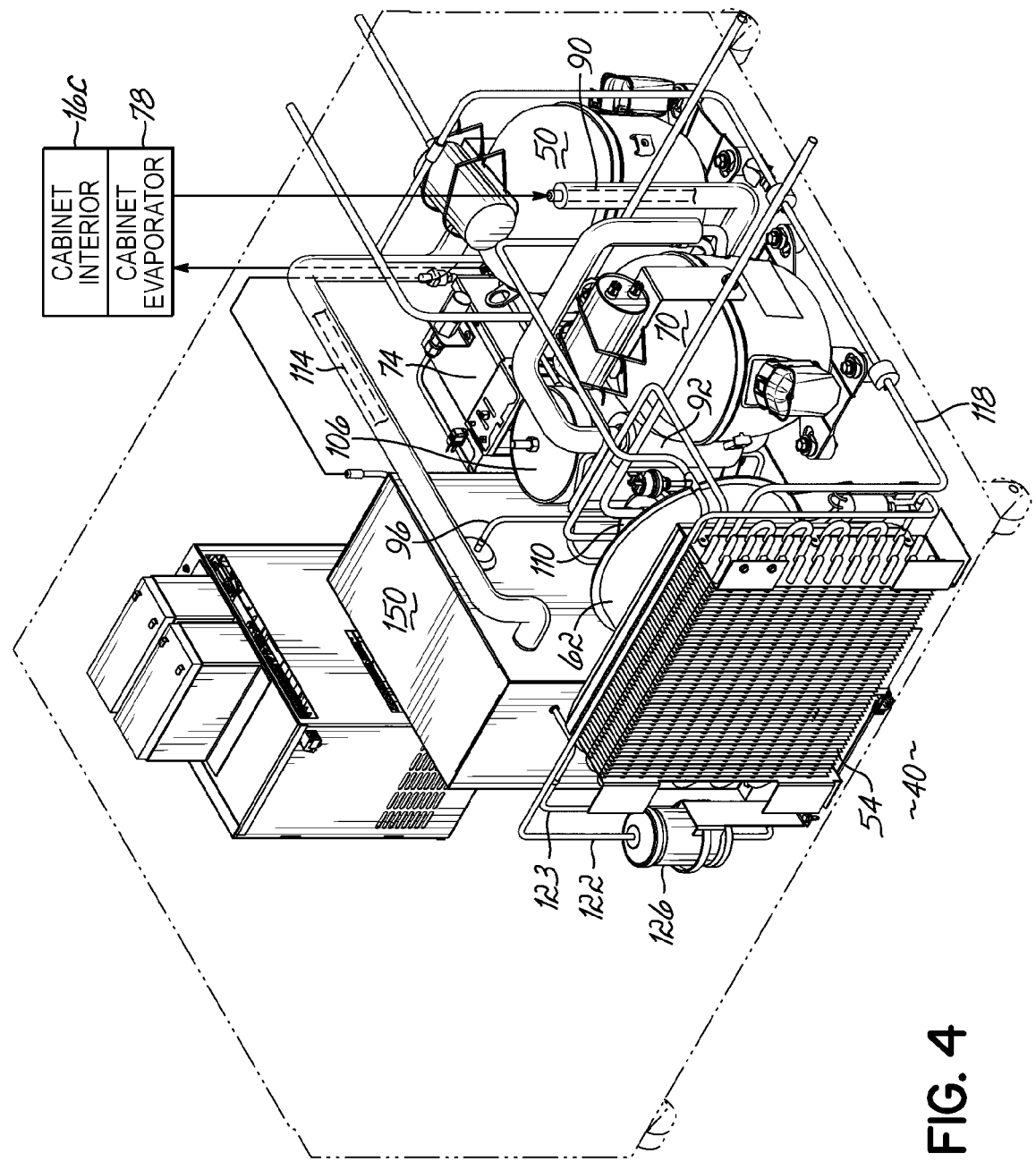
FIG. 4 is a perspective view illustrating an interior portion of the deck of FIG. 2.
Figure 5:
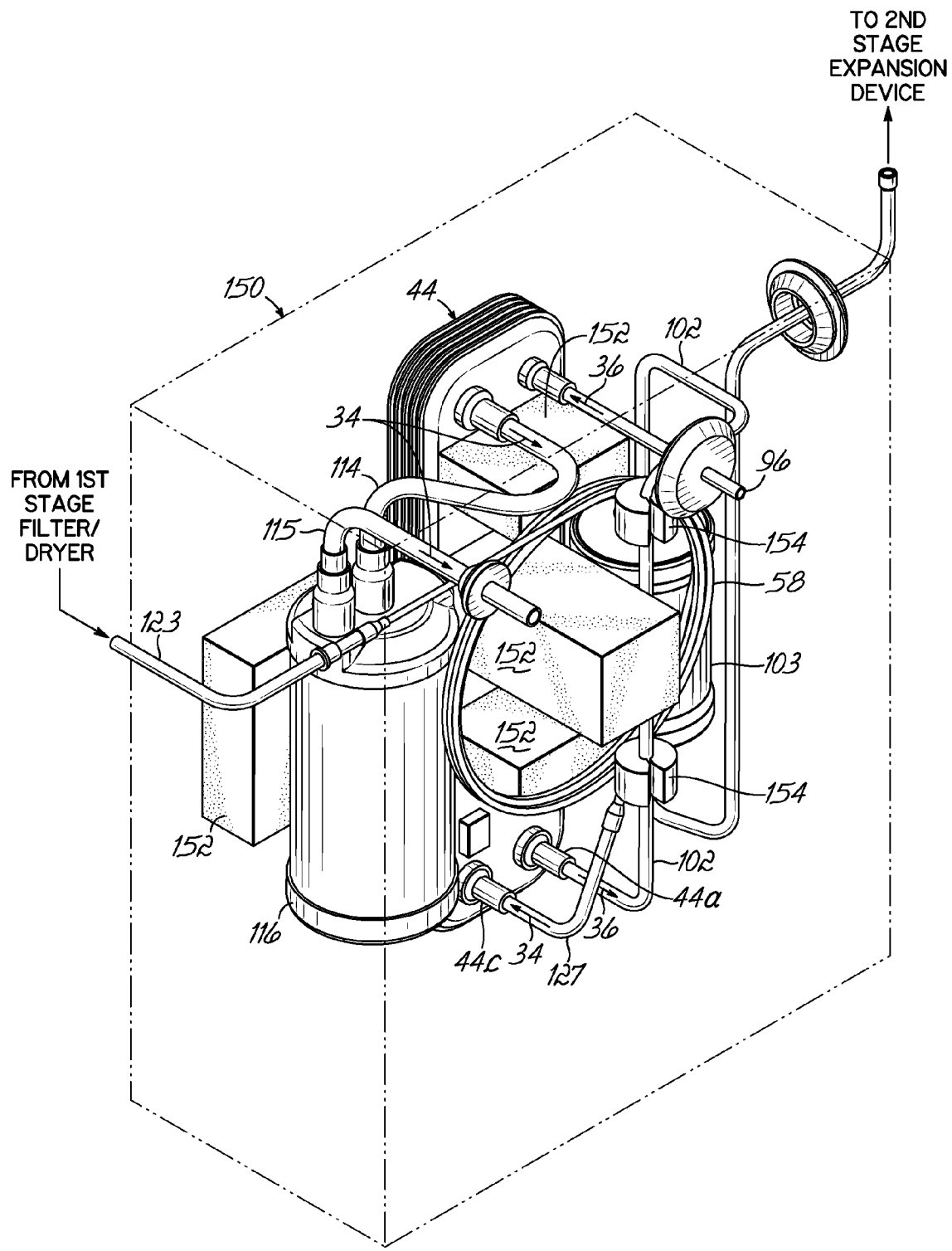
FIG. 5 is a perspective view of an interior portion of an insulated enclosure within the deck of FIGS. 2-3.

A person having ordinary skill in the art will appreciate that the environments illustrated throughout FIGS. 1-34 are not intended to limit the scope of embodiments of the invention. In particular, ULT 10, user interface 18, first stage 24, second stage 26, controller 130, and/or injector system 160 may include fewer or additional components consistent with alternative embodiments of the invention. Indeed, a person having skill in the art will recognize that other alternative hardware and/or software environments may be used without departing from the scope of the invention. For example, a first portion of the first stage 24 and/or second stage 26 may be thermally connected, but not fluidly connected, to another portion of the respective first stage 24 and/or second stage (e.g., such as through a first fluid line that is not shown and thermally couples the first refrigerant 34 in conduit 114 to the first refrigerant in conduit 115, and/or such as through a second fluid line that is not shown and thermally couples the second refrigerant 36 from the filter/dryer unit 103 to the second refrigerant 36 from the accumulator device 92). Also for example, the injector system 160 is illustrated in FIG. 2 as located external to the ULT 10. In alternative embodiments, the injector system 160 is located inside the ULT 10, such as in the deck 14, and more particularly within the first stage 24 or second stage 26. Additionally, a person having ordinary skill in the art will appreciate that the controller 130 may include more or fewer applications.

Still further, a person having ordinary skill in the art will appreciate that the screens illustrated throughout FIGS. 7-34 are intended to provide information associated with the data that can be provided by and/or input to a ULT 10 consistent with embodiments of the invention. Specifically, individual screens may include more or fewer components, while the ULT 10 may display more or fewer screens than those described and/or illustrated. For example, each screen with more than one control to enter data may include only one confirm entry icon 232 that operates to input the data specified by the user in the multiple controls at one time, as opposed to one confirm entry icon 232 for each control. As such, other alternative hardware and software environments may be used without departing from the scope of embodiments of the invention.

The routines executed to implement the embodiments of the invention, whether implemented as part of an operating system or a specific application, component, program, object, module, or sequence of operations, instructions, or steps executed by one or more microprocessors, controller, or computing system will be referred to herein as a "sequence of operations," a "program product," or, more simply, "program code." The program code typically comprises one or more instructions that are resident at various times in various memory and storage devices, and that, when read and executed by one or more processors, cause a controller and/or computing system to perform the steps necessary to execute steps, elements, and/or blocks embodying the various aspects of the invention.

While the invention has and hereinafter will be described in the context of fully functioning controllers and/or computing system, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Software Description and Flows

Figure 35:
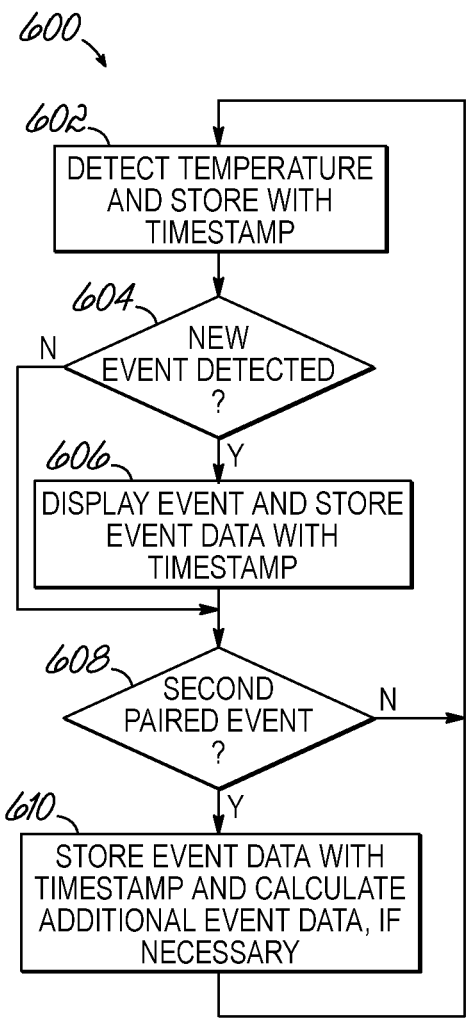
FIG. 35 is a flowchart illustrating a sequence of operations to detect a temperature and an event associated with the ULT of FIG. 1.

FIG. 35 is a flowchart 600 illustrating a sequence of operations to detect the temperature of the interior of the ULT as well as events associated with the ULT consistent with embodiments of the invention. Specifically, the controller detects the cabinet interior temperature and stores it with a timestamp (block 602). The controller then determines whether a new event is detected (block 604). For example, an event may include, but is not limited to, a power on event, a power off event, a power failure event, a power restored event, a door open event, a door close event, a component failure event, an injection procedure event, an interface locked event, a user management event, a service event, an interface unlocked event, a connectivity event, a temperature event, and/or a user identification entered event. Particular events may be associated with each other (e.g., such as the door open and door closed events) such that the controller determines whether the new event is associated with a previous event such that there are not two identical unpaired events in a row (e.g., a door open event followed by a door open event, a power failure event followed by a power failure event). Thus, when a new event is detected ("Yes" branch of decision block 604) the controller displays that event and stores data associated with that event (e.g., such as the identity of the user associated with the event and the interior cabinet temperature at the time of the event) along with a timestamp (block 606).

When a new event has not been detected ("No" branch of decision block 604) or after data associated with a new event has been stored (block 606), the controller determines whether the event is the second event of a pair of events (block 608). When the event is a second event of a pair of events ("Yes" branch of decision block 608), the controller stores the event data with a timestamp and, optionally, calculates additional event data (block 610). Additional event data that is calculated may include a duration of the event, a rise in the cabinet interior temperature associated with the event, as well as other data.

Figure 36:
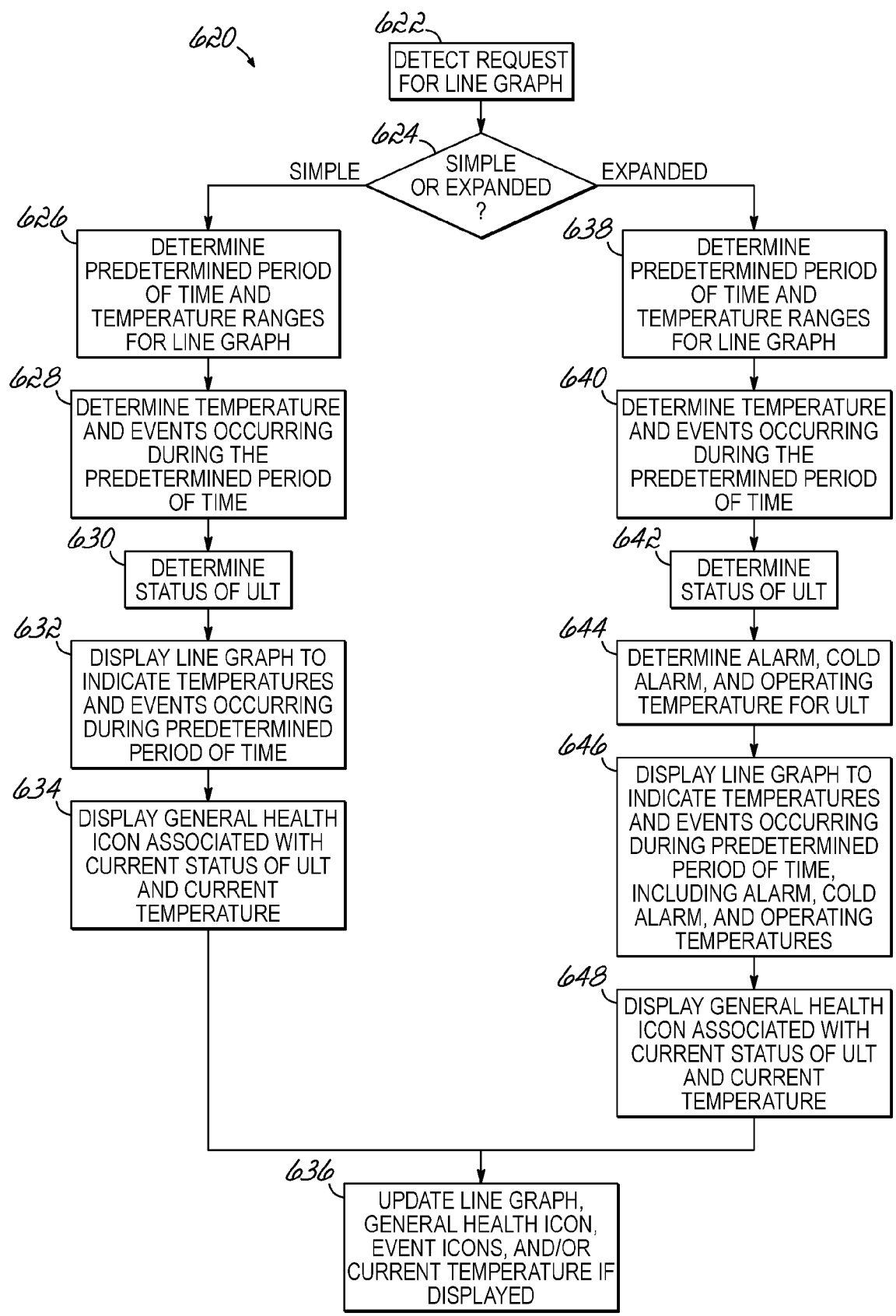
FIG. 36 is a flowchart illustrating a sequence of operations to display a cabinet interior temperature and/or an event occurring over a predetermined period of time and associated with the ULT of FIG. 1.

As discussed above, embodiments of the invention display the temperature and/or events associated with a ULT that occur over a predetermined period of time. In particular, the temperature and/or events over that predetermined period of time are displayed on a line graph. FIG. 36 is a flowchart 620 illustrating a sequence of operations for a controller to display an interior cabinet temperature and/or at least one event occurring during a predetermined amount of time. In particular, the controller detects a request by the user to view a line graph (block 622). In response, the controller determines whether to display a simple line graph (e.g., as illustrated in FIG. 26) or an expanded line graph (e.g., as illustrated in FIG. 27). Specifically, the controller determines whether to display a simple line graph or an expanded line graph based upon the particular icon used to request to display the line graph.

When the controller determines to display the simple line graph ("Simple" branch of decision block 624) the controller determines the predetermined period of time for the line graph as well as the temperature range for the line graph (e.g., the "X" and "Y" axes of the line graph, respectively) (block 626). The controller then determines the cabinet interior temperature and events that occurred over that predetermined period of time (block 628) as well as the current status of the ULT (block 630). The controller may then display the simple line graph that indicates the temperature and events occurring during the predetermined amount of time (block 632) and displays a general health icon associated with the current status of the ULT as well as the current cabinet interior temperature (block 634). However, in some embodiments, and specifically when there are too many events to legibly display them all, the controller may omit events occurring during the predetermined amount of time. The controller then updates the line graph, general health icon, event icons, and/or current temperature appropriately while the line graph is displayed (block 636).

Returning to block 624, when the controller determines to display the expanded line graph ("Expanded" branch of decision block 624) the controller again determines the predetermined period of time for the line graph as well as the temperature range for the line graph (e.g., the "X" and "Y" axes of the line graph, respectively) (block 638). The controller also determines the cabinet interior temperature and events occurring during the predetermined period of time (block 640) as well as the current status of the ULT (block 642). The controller then determines the alarm, cold alarm, and operating temperatures for the ULT (block 644). The controller may then display the expanded line graph that indicates the temperature and events occurring during the predetermined amount of time as well as the alarm temperature, the cold alarm temperature, and the operating temperature (block 646). However, in some embodiments, and specifically when there are too many events to legibly display them all, the controller may omit events occurring during the predetermined amount of time. The controller also displays a general health icon associated with the current status of the ULT (block 648). The controller then updates the line graph, general health icon, event icons, and/or current temperature appropriately while the line graph is displayed (block 636).

Figure 37:
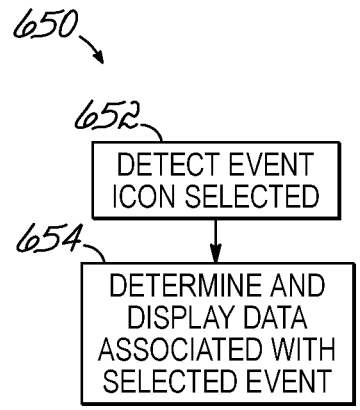
FIG. 37 is a flowchart illustrating a sequence of operations to display data associated with a selected event in turn associated with the ULT of FIG. 1.

Embodiments of the invention provide user selectable elements that a user may select to view more detailed information associated with an event. FIG. 37 is a flowchart 650 illustrating a sequence of operations to display data associated with selected events. Specifically, when a user selects an event icon (block 652) the controller determines and displays data associated with that selected event (block 654).

Figure 38:
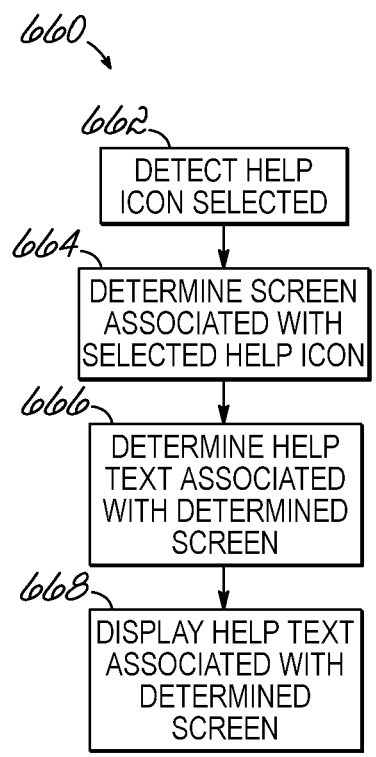
FIG. 38 is a flowchart illustrating a sequence of operations to display context relevant data associated with a screen in turn associated with the ULT of FIG. 1.

As also discussed above, embodiments of the invention provide context appropriate help in response to the user selecting a help icon. FIG. 38 is a flowchart 660 illustrating a sequence of events to display context relevant data associated with a particular screen. Specifically, when a user selects a help icon (block 662) the controller determines the screen associated with that selected help icon (e.g., the screen being currently displayed) (block 664). The controller then determines the help text associated with the determined screen (block 666) and displays that help text (block 668). For example, and in some embodiments, each screen displayed by user interface is associated with a unique identifier (e.g., a number and/or string). The controller thus determines the unique identifier of the screen, determines the help text associated with that screen, and displays that help text.

After a primary power source has recovered from a failure, the ULT may be configured utilize that primary power source after a predetermined time delay and/or after a random time delay. In this manner, a primary power source (e.g., such as electrical system) providing power to a plurality of ULTs may not be taxed by the plurality of ULTs simultaneously switching to that primary power source. FIG. 39 is a flowchart 670 illustrating a sequence of operations for a ULT to utilize a primary power source after that primary power source has recovered from a failure. Specifically, the controller detects a failure of the primary power source (block 672) and utilizes a backup power source (block 674). The controller then determines whether the primary power source has recovered from a failure (block 676). When the primary power source has not recovered from a failure ("No" branch of decision block 676) the controller continues to determine whether the primary power source has recovered from a failure (block 676). When the primary power source has recovered from a failure ("Yes" branch of decision block 676) the controller determines the time delay to utilize the primary power source (block 678) and utilizes the primary power source after the time delay has expired (block 680). Specifically, the controller determines whether a user has specified a time delay or whether the controller has determined a random time delay. Thus, when a time delay is configured (e.g., either specified by the user or determined, randomly, by the controller), the ULT will wait until the expiration of that time delay to switch from the backup power source to the primary power source when the primary power source has recovered from a failure. Alternatively, when a time delay is not configured, the ULT will immediately switch from the backup power source to the primary power source when the primary power source has recovered from a failure.

The controller may display a print icon for the user to select to store data in the memory of the ULT for later retrieval consistent with embodiments of the invention. FIG. 40 is a flowchart 690 illustrating a sequence of operations to store data associated with the ULT in response to the selection of the print icon. Specifically, the controller detects the user selecting a print icon (block 692) and captures an image of a line graph, data associated with a line graph (e.g., the cabinet interior temperature and/or events over the predetermined period of time associated with the line graph), and/or data associated with the ULT (e.g., the cabinet interior temperature and/or events) that has occurred over at least one day (block 694). The controller then stores the image of the line graph in an image file, the data associated with the line graph in a database (e.g., such as in a file), and/or the data associated with the ULT occurring over at least one day in a database (e.g., such as in a file) (block 696). In particular, the controller is configured to create a log of the data associated with the ULT since the day started in response to a user selecting the print icon. When the user selects the print icon more than once in one day, the controller may be configured to store a log of data that covers the time since the day began in response to the first selection of the print icon, but store a log of data that covers the time since the last selection of the print icon for each subsequent selection of the print icon. Alternatively, the controller may be configured to store a log of data that covers the time since the day began in response to the selection of the print icon regardless of whether that print icon was previously selected, then overwrite a previous log of data for the day.

In some embodiments, the ULT is configured to automatically create a log of data associated with the ULT every month. In particular, and in response to entering a new month, the ULT captures data associated with the ULT (e.g., the cabinet interior temperature and/or events) occurring during the previous month and stores that data in a database (e.g., such as in a file).

As discussed above, embodiments of the invention initiate an injection procedure in response to reaching an alarm temperature. FIG. 41 is a flowchart 700 illustrating a sequence of events for an injector system to initiate an injection procedure. Specifically, the injector system detects that an alarm temperature has been reached or exceeded (block 702) and determines a refrigerant to utilize in the injection procedure (block 704). In particular, the injector system may determine which refrigerant to utilize in the injection procedure based upon a user selected refrigerant stored in its memory. As such, the injector system initiates an injection procedure with the determined refrigerant (block 706).

While the present invention has been illustrated by a description of the various embodiments, and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described.

In particular, a person having ordinary skill in the art will appreciate that additional user selectable elements, such as user selectable text, user selectable animations, a user selectable area of a screen, and/or additional user selectable elements other than user selectable icons may be used without departing from the scope of the invention. Moreover, a person having ordinary skill in the art will appreciate that any of the blocks of the above flowcharts may be deleted, augmented, made to be simultaneous with another, combined, or be otherwise altered in accordance with the principles of the embodiments of the invention. Still further, a person having ordinary skill in the art will appreciate that the ULT may be remotely controlled, such as with a separate computing system, and that any of the screens illustrated throughout FIGS. 7-34 may be illustrated on that separate computing system. Accordingly, departures may be made from such details without departing from the spirit or scope of applicant's general inventive concept.

What is claimed is:

1. A method of displaying information associated with a refrigeration system, comprising:
    monitoring a temperature associated with the refrigeration system;
    detecting events associated with the refrigeration system;
    displaying the temperature and at least one event associated with the refrigeration system occurring during a predetermined period of time, wherein the step of displaying the temperature occurring during the predetermined period of time comprises displaying the temperature on a line graph that indicates a change in the temperature occurring during the predetermined period of time; and
    displaying at least one detected event associated with the refrigeration system occurring during the predetermined period of time, wherein the step of displaying the at least one detected event occurring during the predetermined period of time comprises displaying a user interface element associated with the at least one detected event at a respective time on the line graph corresponding to an occurrence of the at least one detected event occurring, with the user interface element being displayed separately from the line graph.

2. The method of claim 1, wherein the line graph includes an indication of a predetermined high temperature threshold associated with the refrigeration system.

3. The method of claim 1, wherein the line graph includes an indication of a predetermined low temperature threshold associated with the refrigeration system.

4. The method of claim 1, wherein the line graph includes an indication of a set temperature associated with the refrigeration system.

5. The method of claim 1, further comprising:
    adjusting the predetermined amount of time, wherein adjusting the predetermined amount of time adjusts the predetermined amount of time displayed by the line graph.

6. The method of claim 5, further comprising:
    in response to adjusting the predetermined amount of time displayed by the line graph, removing the user interface element associated with the at least one detected event.

7. The method of claim 1, further comprising:
indicating the current temperature associated with the refrigeration system.

8. The method of claim 1, wherein the user interface element is a user-selectable user interface element, the method further comprising:
in response to selection of the user interface element, displaying information associated with the at least one detected event.

9. The method of claim 8, wherein the information includes data selected from the group consisting of a date the at least one detected event occurred, a time that the at least one detected event occurred, a duration of the at least one detected event, a time when the refrigeration system recovered from the at least one detected event, a rise in temperature associated with the at least one detected event, a high temperature associated with the at least one detected event, a user associated with the at least one detected event, and combinations thereof.

10. The method of claim 1, further comprising:
displaying a second user interface element that indicates a state of the refrigeration system.

11. The method of claim 10, wherein the second user interface element is a user-selectable user interface element, the method further comprising:
in response to selection of the second user interface element, displaying information associated with the state of the refrigeration system.

12. The method of claim 10, further comprising:
in response to detecting an abnormal state associated with at least a portion of the refrigeration system, adjusting a graphical indicia associated with the second user interface element.

13. The method of claim 1, wherein displaying the user interface element associated with the at least one detected event includes:
indicating a duration of the at least one detected event.

14. The method of claim 1, wherein the temperature occurring during the predetermined period of time and the at least one detected event occurring during the predetermined period of time are displayed on a touchscreen display of the refrigeration system.

15. The method of claim 1, wherein the temperature occurring during the predetermined period of time and the at least one detected event occurring during the predetermined period of time are displayed on a display separate from the refrigeration system.

16. The method of claim 1, wherein the at least one detected event includes an event selected from the group consisting of a power on event, a power off event, a power failure event, a power restored event, a door open event, a door closed event, a component failure event, an injection procedure event, a user interface locked event, a user interface unlocked event, a user management event, a service event, a connectivity event, a low temperature event, a high temperature event, a set temperature reached event, a user identification entered event, and combinations thereof.

17. The method of claim 1, further comprising:
displaying a second user interface element, wherein the second user interface element is a user selectable element; and
in response to selection of the second user interface element, storing data associated with the temperature and at least one detected event occurring during the predetermined period of time in a file in a memory of the refrigeration system.

18. The method of claim 1, wherein the user interface element comprises an icon.

19. A refrigeration system, comprising: a refrigerated cabinet;
at least one processing unit;
a user interface;
and a memory containing program code, the program code configured to, when executed by the at least one processing unit, monitor a temperature associated with the refrigeration system, detect events associated with the refrigeration system, display the temperature and at least one event associated with the refrigeration system occurring during a predetermined period of time on the user interface, wherein the step of displaying the temperature occurring during the predetermined period of time comprises displaying the temperature on a line graph that indicates a change in the temperature occurring during the predetermined period of time, and display at least one detected event associated with the refrigeration system occurring during the predetermined period of time, wherein the step of displaying the at least one detected event occurring during the predetermined period of time comprises displaying a user interface element associated with the at least one detected event at a respective time on the line graph corresponding to an occurrence of the at least one detected event, with the user interface element being displayed separately from the line graph.

20. The refrigeration system of claim 19, wherein the line graph includes an indication of a predetermined high temperature threshold associated with the refrigeration system.

21. The refrigeration system of claim 19, wherein the line graph includes an indication of a predetermined low temperature threshold associated with the refrigeration system.

22. The refrigeration system of claim 19, wherein the line graph includes an indication of a set temperature associated with the refrigeration system.

23. The refrigeration system of claim 19, wherein the program code is further configured to adjust the predetermined amount of time, wherein adjusting the predetermined amount of time adjusts the predetermined amount of time displayed by the line graph.

24. The refrigeration system of claim 23, wherein the program code is further configured to remove the user interface element associated with the at least one detected event in response to adjusting the predetermined amount of time displayed by the line graph.

25. The refrigeration system of claim 19, wherein the program code is further configured to indicate the current temperature associated with the refrigeration system.

26. The refrigeration system of claim 19, wherein the user interface element is a user-selectable element, and wherein the program code is further configured to display information associated with the at least one detected event in response to selection of the user interface element.

27. The refrigeration system of claim 26, wherein the information includes data selected from the group consisting of a date the at least one detected event occurred, a time that the at least one detected event occurred, a duration of the at least one detected event, a time when the refrigeration system recovered from the at least one detected event, a rise in temperature associated with the at least one detected event, a high temperature associated with the at least one detected event, a user associated with the at least one detected event, and combinations thereof.

28. The refrigeration system of claim 19, wherein the program code is further configured to display a second user interface element that indicates a state of the refrigeration system.

29. The refrigeration system of claim 28, wherein the second user interface element is a user-selectable element, and wherein the program code is further configured to display information associated with the state of the refrigeration system in response to selection of the second user interface element.

30. The refrigeration system of claim 28, wherein the program code is further configured to adjust a graphical indicia associated with the second user interface element in response to detecting an abnormal state associated with at least a portion of the refrigeration system.

31. The refrigeration system of claim 19, wherein the program code is further configured to indicate a duration of the at least one detected event.

32. The refrigeration system of claim 19, wherein the user interface is a touchscreen display.

33. The refrigeration system of claim 19, wherein the at least one detected event includes an event selected from the group consisting of a power on event, a power off event, a power failure event, a power restored event, a door open event, a door closed event, a component failure event, an injection procedure event, a user interface locked event, a user interface unlocked event, a user management event, a service event, a connectivity event, a low temperature event, a high temperature event, a set temperature reached event, a user identification entered event, and combinations thereof.

34. The refrigeration system of claim 19, wherein the program code is further configured to display a second user interface element, wherein the second user interface element is a user selectable element, and wherein the program code is further configured to store data associated with the temperature and at least one detected event occurring during the predetermined period of time in a file in the memory of the refrigeration system in response to selection of the second user interface element.

35. The refrigeration system of claim 19, wherein the user interface element comprises an icon.

36. A method of displaying information associated with a refrigeration system on a display, comprising:
monitoring a temperature associated with the refrigeration system;
detecting events associated with the refrigeration system;
displaying the temperature associated with the refrigeration system occurring during a predetermined period of time on the display, wherein the step of displaying the temperature occurring during the predetermined period of time comprises displaying the temperature on a line graph that indicates a change in the temperature occurring during the predetermined period of time on the display; and
displaying at least one detected event associated with the refrigeration system occurring during the predetermined period of time, wherein the step of displaying the at least one detected event occurring during the predetermined period of time comprises displaying a user interface element associated with the at least one detected event at a variable location on the display and associated with the line graph in response to an occurrence of the at least one detected event, with the user interface element being displayed separately from the line graph.

37. The method of claim 36, further comprising:
adjusting the predetermined amount of time, wherein adjusting the predetermined amount of time adjusts the predetermined amount of time displayed by the line graph.

38. The method of claim 36, wherein the user interface element is a user-selectable user interface element, the method further comprising:
in response to selection of the user interface element, displaying information associated with the at least one detected event.

39. The method of claim 38, wherein the information includes data selected from the group consisting of a date the at least one detected event occurred, a time that the at least one detected event occurred, a duration of the at least one detected event, a time when the refrigeration system recovered from the at least one detected event, a rise in temperature associated with the at least one detected event, a high temperature associated with the at least one detected event, a user associated with the at least one detected event, and combinations thereof.

40. The method of claim 36, wherein the temperature occurring during the predetermined period of time and the at least one detected event occurring during the predetermined period of time are displayed on a touchscreen display of the refrigeration system.

41. The method of claim 36, wherein the temperature occurring during the predetermined period of time and the at least one detected event occurring during the predetermined period of time are displayed on a display separate from the refrigeration system.

42. The method of claim 36, wherein the at least one detected event includes an event selected from the group consisting of a power on event, a power off event, a power failure event, a power restored event, a door open event, a door closed event, a component failure event, an injection procedure event, a user interface locked event, a user interface unlocked event, a user management event, a service event, a connectivity event, a low temperature event, a high temperature event, a set temperature reached event, a user identification entered event, and combinations thereof.

43. The method of claim 36, wherein the user interface element comprises an icon.

44. A refrigeration system, comprising:
a refrigerated cabinet;
at least one processing unit;
a user interface; and
a memory containing program code, the program code configured to, when executed by the at least one processing unit, monitor a temperature associated with the refrigeration system, detect events associated with the refrigeration system, display the temperature associated with the refrigeration system occurring during a predetermined period of time on the user interface, wherein the step of displaying the temperature occurring during the predetermined period of time comprises displaying the temperature on a line graph that indicates a change in the temperature occurring during the predetermined period of time on the user interface, and display at least one detected event associated with the refrigeration system occurring during the predetermined period of time, wherein the step of displaying the at least one detected event occurring during the predetermined period of time comprises displaying a user interface element associated with the at least one detected event at a variable location on the user interface and associated with the line graph in response to an occurrence of the at least one detected event, with the user interface element being displayed separately from the line graph.

45. The refrigeration system of claim 44, wherein the program code is further configured to adjust the predetermined amount of time, wherein adjusting the predetermined amount of time adjusts the predetermined amount of time displayed by the line graph.

46. The refrigeration system of claim 44, wherein the user interface element is a user-selectable element, and wherein the program code is further configured to display information associated with the at least one detected event in response to selection of the user interface element.

47. The refrigeration system of claim 46, wherein the information includes data selected from the group consisting of a date the at least one detected event occurred, a time that the at least one detected event occurred, a duration of the at least one detected event, a time when the refrigeration system recovered from the at least one detected event, a rise in temperature associated with the at least one detected event, a high temperature associated with the at least one detected event, a user associated with the at least one detected event, and combinations thereof.

48. The refrigeration system of claim 42, wherein the user interface is a touchscreen display.

49. The refrigeration system of claim 44, wherein the at least one detected event includes an event selected from the group consisting of a power on event, a power off event, a power failure event, a power restored event, a door open event, a door closed event, a component failure event, an injection procedure event, a user interface locked event, a user interface unlocked event, a user management event, a service event, a connectivity event, a low temperature event, a high temperature event, a set temperature reached event, a user identification entered event, and combinations thereof.

\* \* \* \* \*